United States Patent
Yamazaki

(10) Patent No.: US 8,382,196 B2
(45) Date of Patent: Feb. 26, 2013

(54) VEHICLE INSTRUMENT PANEL REINFORCEMENT ATTACHMENT STRUCTURE

(75) Inventor: Yasunobu Yamazaki, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/142,351

(22) PCT Filed: Sep. 25, 2009

(86) PCT No.: PCT/JP2009/066702
§ 371 (c)(1),
(2), (4) Date: Jun. 27, 2011

(87) PCT Pub. No.: WO2011/036780
PCT Pub. Date: Mar. 31, 2011

(65) Prior Publication Data
US 2012/0038181 A1    Feb. 16, 2012

(51) Int. Cl.
*B60J 7/00*    (2006.01)
(52) U.S. Cl. .................... 296/193.02; 296/70
(58) Field of Classification Search ............. 296/193.02, 296/70
See application file for complete search history.

(56) References Cited

U.S. PATENT DOCUMENTS

| | | | | |
|---|---|---|---|---|
| 7,810,874 | B2 * | 10/2010 | Vican et al. .............. | 296/193.02 |
| 8,029,045 | B2 * | 10/2011 | Merkle et al. ............. | 296/193.02 |
| 2009/0134654 | A1 | 5/2009 | Clashman et al. | |
| 2009/0174223 | A1 | 7/2009 | Penner et al. | |

FOREIGN PATENT DOCUMENTS

| | | |
|---|---|---|
| JP | U-2-6678 | 1/1990 |
| JP | A-8-192770 | 7/1996 |
| JP | A-10-129520 | 5/1998 |
| JP | A-10-175568 | 6/1998 |
| JP | A-10-316032 | 12/1998 |
| JP | A-2001-253368 | 9/2001 |
| JP | A-2007-186034 | 7/2007 |
| JP | A-2007-191014 | 8/2007 |
| JP | A-2008-114645 | 5/2008 |
| JP | A-2009-208590 | 9/2009 |

OTHER PUBLICATIONS

Decision to Grant a Patent issued in Japanese Patent Application No. 2011-501053 dated Jul. 24, 2012 (w/ English Translation).
International Search Report dated Dec. 22, 2009 in corresponding International Application No. PCT/JP2009/066702 (with translation).
Dec. 20, 2012 European Search Report issued in EP 09 849 811.6.

* cited by examiner

*Primary Examiner* — Joseph Pape
(74) *Attorney, Agent, or Firm* — Oliff & Berridge, PLC

(57) ABSTRACT

Deformation of an instrument panel reinforcement is effectively suppressed even if there is a large difference between impact loads that are inputted to a driver seat side and a passenger seat side of the instrument panel reinforcement. At the passenger seat side of the instrument panel reinforcement, a passenger seat side brace member is provided that joins a cowl inner panel with a small diameter portion of the instrument panel reinforcement in a vehicle front-rear direction. The passenger seat side brace member is structured by a front side bracket and a rear side bracket being detachably joined by a bolt. Therefore, the rear side bracket is detached when an offset impact occurs at the driver seat side, a large load is inputted to a large diameter portion of the instrument panel reinforcement and the small diameter portion is pulled to the vehicle rearward side.

12 Claims, 17 Drawing Sheets

VEHICLE INSTRUMENT PANEL REINFORCEMENT ATTACHMENT STRUCTURE

TECHNICAL FIELD

The present invention relates to an attachment structure of an instrument panel reinforcement for a vehicle.

BACKGROUND ART

A technology for joining an instrument panel reinforcement to a cowl in a vehicle front-rear direction with a cowl-to-brace at the driver seat side is disclosed in the below-mentioned Patent Reference 1 (Japanese Patent Application Laid-Open (JP-A) No. 2008-114645). Describing this briefly, the instrument panel reinforcement is a high-strength pipe-form member joining left and right front pillars. The cowl is a gutter-form member disposed to the vehicle forward side of the instrument panel reinforcement. The cowl-to-brace is formed as an arm, of which a forward end portion is fixed to a rear end portion of the cowl, and a rear end portion of the cowl-to-brace is fixed to the instrument panel reinforcement. Thus, the instrument panel reinforcement and the cowl are joined in the vehicle front-rear direction.

Patent Reference 2 (JP-A No. H10-129520) discloses a technology in which an instrument panel reinforcement and a dash panel are joined by dash braces that extend in the vehicle front-rear direction, at both the driver seat side and the passenger seat side.

The above-mentioned cowl-to-brace and dash braces are provided for the purpose of reducing booming noise, which is one of the types of noise in a vehicle cabin, and the like.

Patent Reference 1: JP-A No. 2008-114645
Patent Reference 2: JP-A No. H10-129520

DISCLOSURE OF INVENTION

Problem to be Solved by the Invention

However, an instrument panel reinforcement is ordinarily formed to be broad at the driver seat side and narrow at the passenger seat side. In other words, an instrument panel reinforcement has different cross-sectional profiles at the driver seat side and the passenger seat side. Accordingly, cowl braces also have different shapes and configurations at the driver seat side and the passenger seat side.

Furthermore, because the layout of an engine does not have left-right symmetry about the middle of the vehicle width direction, when there is a frontal collision, the size of an impact load that is transmitted to a cowl and dash panel is different between the driver seat side and the passenger seat side. That is, backward movement amounts of the cowl and dash panel are different between the driver seat side and the passenger seat side.

Moreover, even among frontal collisions there are different collision conditions between full-wrap collisions and offset collisions. Consequently, there are large differences between impact loads transmitted to instrument panel reinforcements at the driver seat side and impact loads that are transmitted at the passenger seat side.

For the above reasons, when there is a frontal collision, there may be a difference between backward movement amounts of an instrument panel reinforcement at the driver seat side (a large diameter portion) and the passenger seat side (a small diameter portion), and excessive stress may be concentrated on a connection portion between the two sides. Therefore, the prior technologies described above have room for improvement in this respect.

In consideration of the circumstances described above, an object of the present invention is to provide a vehicle instrument panel reinforcement mounting structure that is capable of effectively suppressing deformation of the instrument panel reinforcement even if there is a large difference between impact loads that are inputted to a driver seat side and a passenger seat side of the instrument panel reinforcement.

Means for Solving the Problem

A vehicle instrument panel reinforcement attachment structure relating to a first aspect of the present invention is to be employed at an instrument panel reinforcement that is formed such that a driver seat side thereof has a greater section modulus than a passenger seat side thereof, the vehicle instrument panel reinforcement attachment structure including: a driver seat side brace member and a passenger seat side brace member that are disposed, respectively, at the driver seat side and passenger seat side of the instrument panel reinforcement, that are each formed in a long strip shape, and that join the instrument panel reinforcement with a cowl or dashboard disposed at the vehicle forward side of the instrument panel reinforcement; and a relative movement portion that is provided at the passenger seat side brace member and that, if a tension load of at least a predetermined value acts thereon, causes the passenger seat side brace member, at least at the side thereof of the direction of action of the tension load, to relatively move to the vehicle rearward side with respect to an attachment position of the passenger seat side brace member.

A vehicle instrument panel reinforcement attachment structure relating to a second aspect of the present invention is to be employed at an instrument panel reinforcement that is formed such that a driver seat side thereof has a greater section modulus than a passenger seat side thereof, the vehicle instrument panel reinforcement attachment structure including: a driver seat side brace member and a passenger seat side brace member that are disposed, respectively, at the driver seat side and passenger seat side of the instrument panel reinforcement, that are each formed in a long strip shape, and that join the instrument panel reinforcement with a cowl or dashboard disposed at the vehicle forward side of the instrument panel reinforcement; and a detachment portion that is provided at the passenger seat side brace member and that, if a tension load of at least a predetermined value acts thereon, causes the passenger seat side brace member, at least at the side thereof of the direction of action of the tension load, to detach from the vehicle body.

A vehicle instrument panel reinforcement attachment structure relating to a third aspect of the present invention is the first aspect or the second aspect, in which the passenger seat side brace member is structured by a front-rear pair of a front side bracket and a rear side bracket that are fixed by fastening with a fastening portion, and the relative movement portion or detachment portion is structured to include a fixed fastening state release mechanism that releases the fixed fastening state of the fastening portion when the tension load of at least the predetermined value acts.

A vehicle instrument panel reinforcement attachment structure relating to a fourth aspect of the present invention is the third aspect, in which the fixed fastening state release mechanism is structured as a detachment mechanism that causes the rear side bracket to detach from the front side bracket without breakage of a member.

A vehicle instrument panel reinforcement attachment structure relating to a fifth aspect of the present invention is the fourth aspect, in which the detachment mechanism includes a slit that is formed in the front side bracket or the rear side bracket and through which a bolt structuring the fastening portion passes, the detachment mechanism being configured such that, when the tension load of at least the predetermined value acts, the rear side bracket is detached from the front side bracket by the slit disengaging from the bolt or by the bolt disengaging from the slit.

A vehicle instrument panel reinforcement attachment structure relating to a sixth aspect of the present invention is the first aspect or the second aspect, in which the passenger seat side brace member is structured by a single bracket, and the relative movement portion or detachment portion is a weakening portion that is provided at the bracket and breaks when the tension load of at least the predetermined value acts.

A vehicle instrument panel reinforcement attachment structure relating to a seventh aspect of the present invention is to be employed at an instrument panel reinforcement that is formed such that a driver seat side thereof has a greater section modulus than a passenger seat side thereof, the vehicle instrument panel reinforcement attachment structure including: a driver seat side brace member and a passenger seat side brace member that are disposed, respectively, at the driver seat side and passenger seat side of the instrument panel reinforcement, that are each formed in a long strip shape, and that join the instrument panel reinforcement with a cowl or dashboard disposed at the vehicle forward side of the instrument panel reinforcement; and an extending structure portion that is provided at the passenger seat side brace member and that, if a tension load of at least a predetermined value acts thereon, causes the passenger seat side brace member to extend to the side of the direction of action of the tension load.

A vehicle instrument panel reinforcement attachment structure relating to an eighth aspect of the present invention is the first aspect or the seventh aspect, in which the passenger seat side brace member is structured by a front-rear pair of a front side bracket and a rear side bracket that are fixed by fastening with a fastening portion, and the relative movement portion or extending structure portion includes a long hole that is formed in the front side bracket or the rear side bracket and through which a bolt structuring the fastening portion passes, the relative movement portion or extending structure portion being configured such that, when the tension load of at least the predetermined value acts, the rear side bracket extends with respect to the front side bracket by the long hole sliding with respect to the bolt or by the bolt sliding in the long hole.

A vehicle instrument panel reinforcement attachment structure relating to a ninth aspect of the present invention is the seventh aspect, in which the passenger seat side brace member is structured by a single bracket and is inflected to the vehicle upward side or the vehicle downward side at a length direction middle portion thereof, and the inflected portion is configured so as to extend when the tension load of at least the predetermined value acts on the bracket.

According to the first aspect of the present invention, if, for example, there is an offset impact that inputs a large load at the driver seat side, then although this load is absorbed by deformation of the vehicle body and the like, a relatively large load is transmitted to the driver seat side of the instrument panel reinforcement through the driver seat side brace member. Meanwhile, although the passenger seat side of the instrument panel reinforcement is joined to the cowl or dashboard by the passenger seat side brace member, the impact load is not transmitted thereto directly. Therefore, there is a difference in the magnitudes of impact loads that are directly transmitted at the driver seat side and the passenger seat side of the instrument panel reinforcement, and deformation amounts to the vehicle rearward side (backward movement amounts) thereof are different. Because the instrument panel reinforcement spans from the driver seat side to the passenger seat side, when the driver seat side of the instrument panel reinforcement acts to move backward to the vehicle rearward side, the passenger seat side of the instrument panel reinforcement is also pulled toward the vehicle rearward side. As a result, there is a relatively large concentration of stress at a boundary portion between the driver seat side and passenger seat side of the instrument panel reinforcement.

Here, in the present invention, the relative movement portion is provided at the passenger seat side brace member. Therefore, if the passenger seat side of the instrument panel reinforcement is pulled toward the vehicle rearward side by the driver seat side of the instrument panel reinforcement and a tension load at or above the predetermined value acts on the passenger seat side brace, the passenger seat side brace member, at least at the side thereof of the direction of action of the tension load, relatively moves to the vehicle rearward side with respect to the attachment position of the passenger seat side brace member. As a result, the occurrence of an excessive concentration of stress at a boundary portion between the driver seat side and passenger seat side of the instrument panel reinforcement, causing a large deformation, is suppressed.

According to the second aspect of the present invention, because the detachment portion is provided at the passenger seat side brace member, if the passenger seat side of the instrument panel reinforcement is pulled toward the vehicle rearward side by the driver seat side of the instrument panel reinforcement and a tension load at or above the predetermined value acts on the passenger seat side brace member, the passenger seat side brace member, at least at the side thereof of the direction of action of the tension load, is detached from the vehicle body. As a result, the occurrence of an excessive concentration of stress at a boundary portion between the driver seat side and passenger seat side of the instrument panel reinforcement, causing a large deformation, is suppressed.

After the detachment, no load is transmitted from the driver seat side to the passenger seat side of the instrument panel reinforcement.

According to the third aspect of the present invention, the passenger seat side brace member is structured by the front-rear pair of the front side bracket and the rear side bracket, which are fastened by the fastening portion, and the relative movement portion or the detachment portion is structured to include the fixed fastening state release mechanism. Consequently, if a tension load at or above the predetermined value acts on the passenger seat side brace member, the fixed fastening state of the fastening portion of the front side bracket and rear side bracket is released. Hence, the rear side bracket relatively moves to the vehicle rearward side with respect to the front side bracket.

When the present invention is configured thus, the load when the passenger seat side of the instrument panel reinforcement is relatively moved to the vehicle rearward side is determined by a fastening load of the fastening portion. In other words, by the fastening load of the fastening portion being changed, what magnitude of tension load acting on the fastening portion of the passenger seat side brace member causes the passenger seat side of the instrument panel reinforcement to relatively move to the vehicle rearward side may be altered.

According to the fourth aspect of the present invention, the fixed fastening state release mechanism is configured as a detachment mechanism that does not involve breakage of a member. Therefore, detachment may by controlled just by the fastening load of the fastening portion.

According to the fifth aspect of the present invention, the detachment mechanism is configured to include a slit. Therefore, when a tension load exceeding the fastening load of the fastening portion acts on the rear side bracket, the slit disengages from the bolt or the bolt disengages from the slit. Hence, the rear side bracket starts to slip to the vehicle rearward side with respect to the front side bracket. Then the slit passes through the bolt or the bolt passes through the slit and the rear side bracket is detached from the front side bracket.

According to the sixth aspect of the present invention, the passenger seat side brace member is structured by a single bracket, and a weakening portion is provided in this bracket. Therefore, if a tension load at or above a predetermined value acts on the bracket, the bracket breaks, from the weakening portion. In the present invention configured thus, the state of joining of the passenger seat side of the instrument panel reinforcement to the vehicle body by the passenger seat side brace member may be released with a minimal number of components.

According to the seventh aspect of the present invention, the extending structure portion is provided at the passenger seat side brace member. Therefore, if the passenger seat side of the instrument panel reinforcement is pulled toward the vehicle rearward side by the driver seat side of the instrument panel reinforcement and a tension load at or above the predetermined value acts on the passenger seat side brace member, the passenger seat side brace member extends to the side of the direction of action of the tension load. As a result, the occurrence of an excessive concentration of stress at a boundary portion between the driver seat side and passenger seat side of the instrument panel reinforcement, causing a large deformation, is suppressed.

According to the eighth aspect of the present invention, the extending structure portion is configured to include a long hole. Therefore, if a tension load exceeding the fastening load of the fastening portion acts on the rear side bracket, the long hole slides with respect to the bolt or the bolt slides with respect to the long hole. Hence, the rear side bracket starts to slip to the vehicle rearward side with respect to the front side bracket. Then, when a terminal end of the long hole reaches the bolt or the bolt reaches a terminal end of the long hole, relative movement of the rear side bracket to the vehicle rearward direction with respect to the front side bracket is stopped.

According to the ninth aspect of the present invention, the passenger seat side brace member is structured by a single bracket and is inflected to the vehicle upward side or the vehicle downward side at a length direction middle portion thereof. Thus, when a tension load at or above the predetermined value acts on the bracket, the inflected portion of the bracket is extended. As a result, the passenger seat side of the instrument panel reinforcement may be relatively moved to the vehicle rearward side by an amount corresponding to the extension of the bracket.

Effects of the Invention

As described above, the vehicle instrument panel reinforcement attachment structure relating to the first aspect of the present invention has an excellent effect of effectively suppressing deformation of the instrument panel reinforcement even if there is a difference in magnitudes of impact loads that are inputted at the driver seat side and the passenger seat side of the instrument panel reinforcement.

The vehicle instrument panel reinforcement attachment structure relating to the second aspect of the present invention has the excellent effect of effectively suppressing deformation of the instrument panel reinforcement even if there is a difference in magnitudes of impact loads that are inputted at the driver seat side and the passenger seat side of the instrument panel reinforcement. In addition, the present invention has an excellent effect in that, after detachment, deformation does not occur at the boundary portion between the driver seat side and passenger seat side of the instrument panel reinforcement.

The vehicle instrument panel reinforcement attachment structure relating to the third aspect of the present invention has an excellent effect in that a load at which the passenger seat side of the instrument panel reinforcement is relatively moved to the vehicle rearward side is easy to adjust.

The vehicle instrument panel reinforcement attachment structure relating to the fourth aspect of the present invention has an excellent effect in that inconsistency in a detachment load at which the rear side bracket is detached from the front side bracket is unlikely to occur.

The vehicle instrument panel reinforcement attachment structure relating to the fifth aspect of the present invention, because the detachment mechanism is configured to include a slit, has an excellent effect in that the structure may be kept relatively simple and consequently high reliability is provided.

The vehicle instrument panel reinforcement attachment structure relating to the sixth aspect of the present invention has an excellent effect in that cost reductions may be enabled.

The vehicle instrument panel reinforcement attachment structure relating to the seventh aspect of the present invention has the excellent effect of effectively suppressing deformation of the instrument panel reinforcement even if there is a difference in magnitudes of impact loads that are inputted at the driver seat side and the passenger seat side of the instrument panel reinforcement. In addition, the present invention has an excellent effect in that, because the passenger seat side of the instrument panel reinforcement is linked to the cowl or dashboard via the rear side bracket and front side bracket, a change in attitude after the passenger seat side of the instrument panel reinforcement has relatively moved to the vehicle rearward side is small.

The vehicle instrument panel reinforcement attachment structure relating to the eighth aspect of the present invention, because the extending structure portion is configured to include a long hole, has an excellent effect in that the structure may be kept relatively simple and consequently high reliability is provided.

The vehicle instrument panel reinforcement attachment structure relating to the ninth aspect of the present invention has an excellent effect in that cost reductions may be enabled.

BEST MODE FOR CARRYING OUT THE INVENTION

First Exemplary Embodiment

Herebelow, a first exemplary embodiment of the vehicle instrument panel reinforcement attachment structure relating to the present invention is described using FIG. 1 to FIG. 6. The arrow FR that is marked as appropriate in these drawings represents a vehicle forward side, the arrow UP represents a vehicle upward side, and an arrow IN represents a vehicle width direction inner side.

Figure 1:
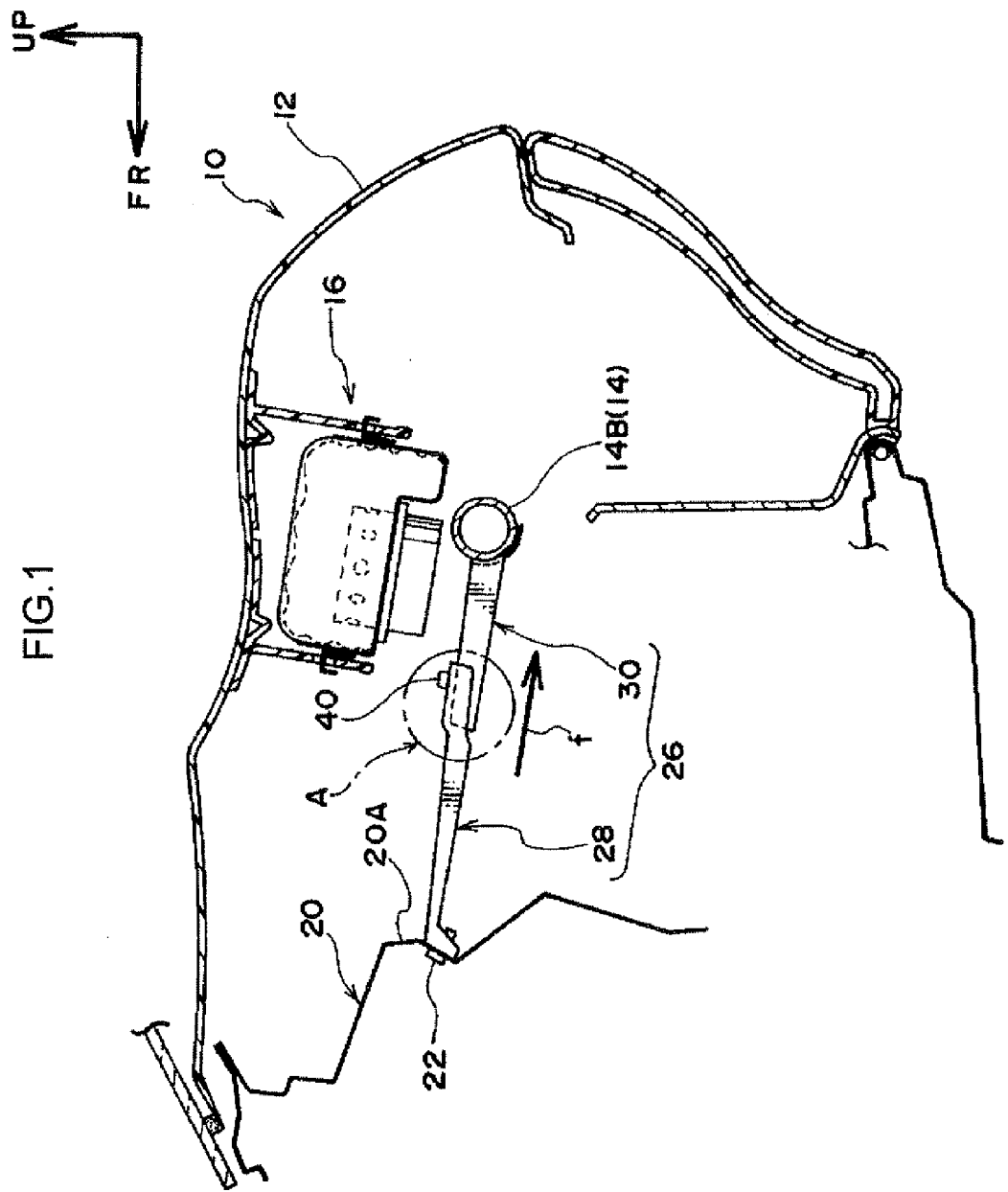
FIG. 1 is a vertical sectional diagram of the passenger seat side of an instrument panel module employing a vehicle instrument panel reinforcement attachment structure relating to a first exemplary embodiment.
Figure 2:
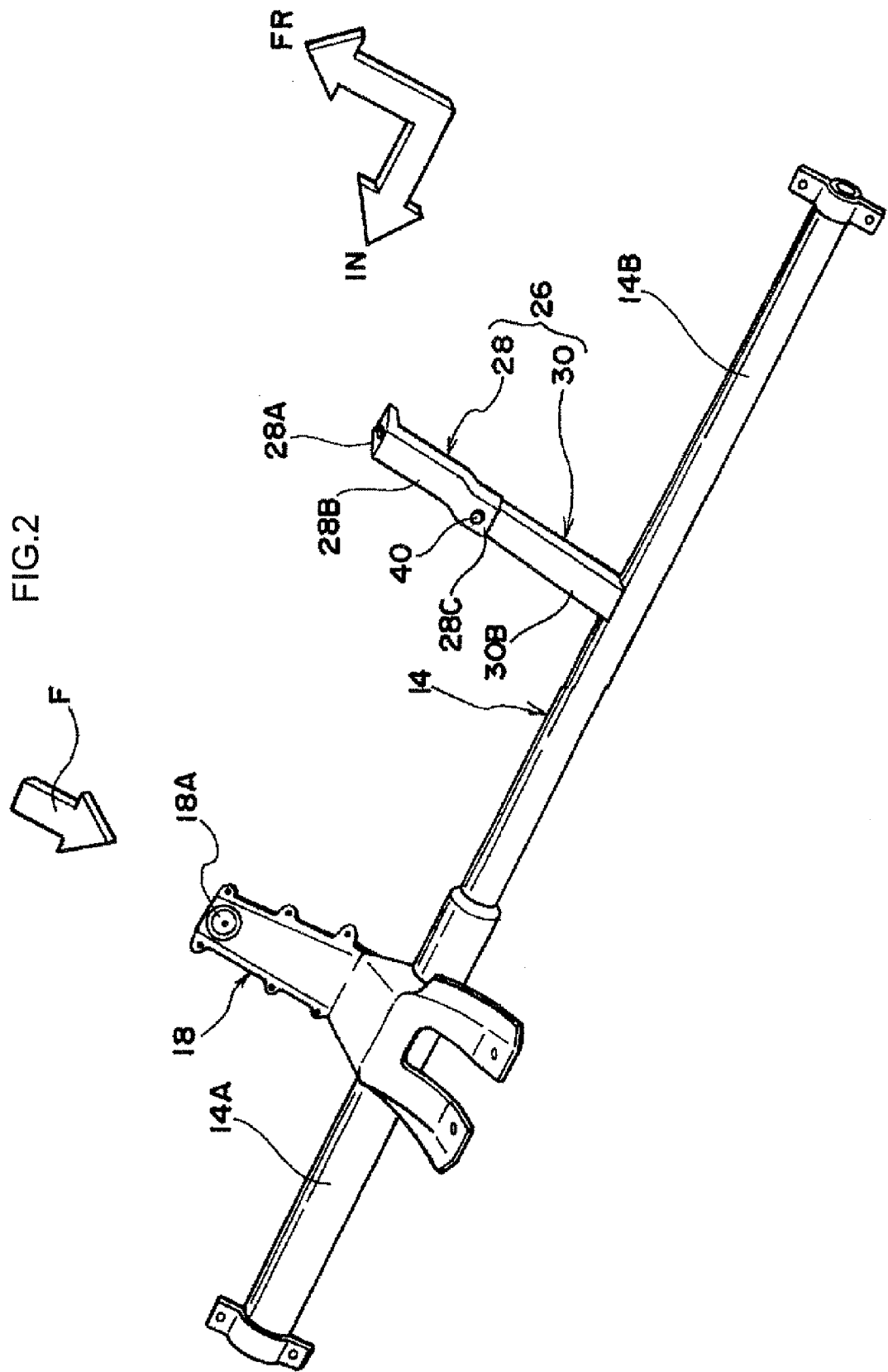
FIG. 2 is a perspective view of the instrument panel reinforcement illustrated in FIG. 1.
Figure 3:
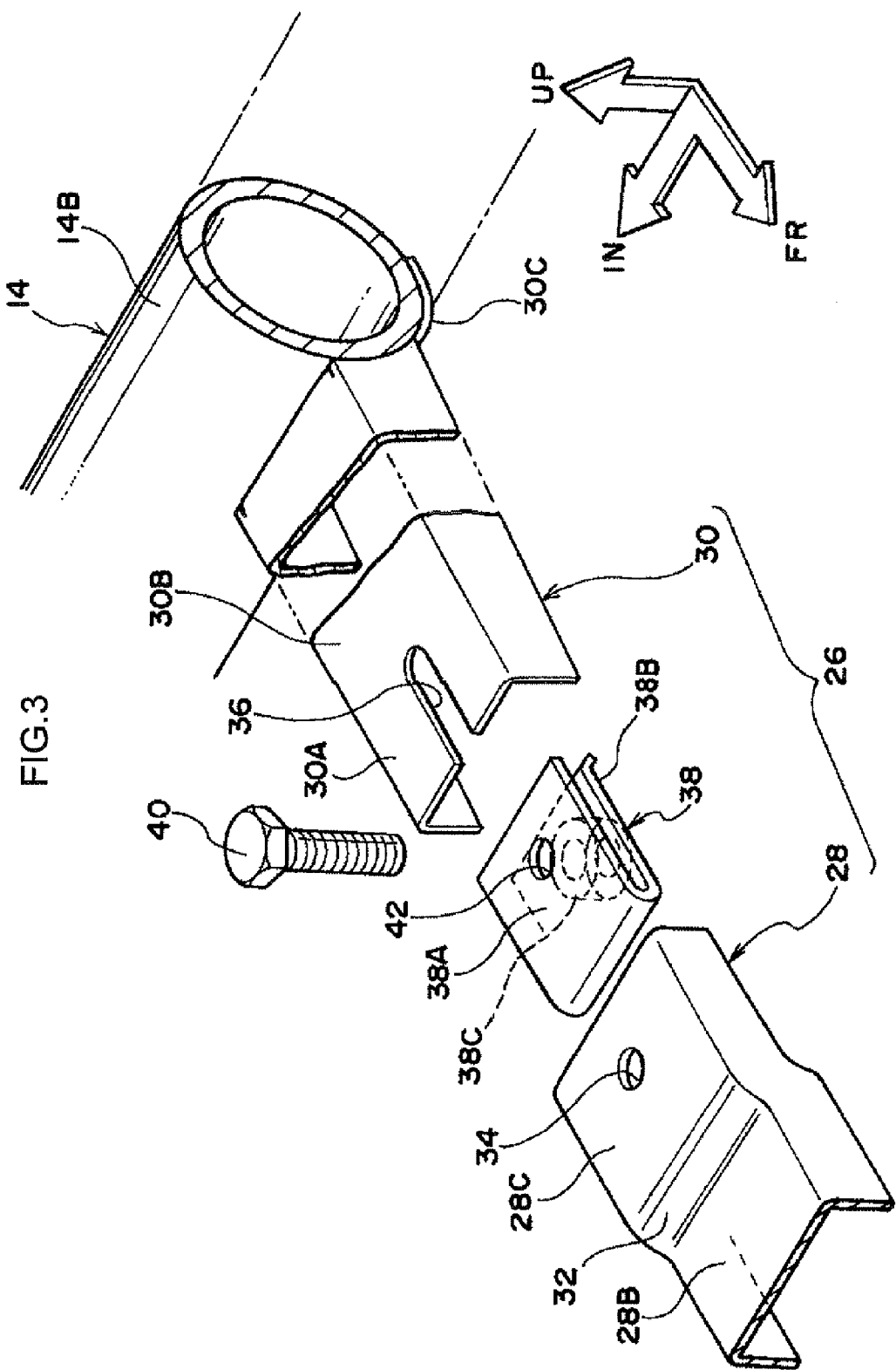
FIG. 3 is an exploded perspective diagram illustrating, magnified, a joining portion (the portion indicated with arrow A in FIG. 1) of a passenger seat side brace member illustrated in FIG. 1.

FIG. 1 shows a vertical sectional diagram of a state in which an instrument panel module is attached to a vehicle body. FIG. 2 shows a perspective view of an instrument panel reinforcement, viewed from the vehicle upward side. As illustrated in these drawings, an instrument panel module 10 is configured to include an instrument panel 12 and an instrument panel reinforcement 14 that is made of metal. The instrument panel 12 is an interior panel disposed in front of the driver seat and passenger seat side. The instrument panel reinforcement 14 is arranged along the vehicle width direction at an inner side of the instrument panel 12.

The instrument panel reinforcement 14 is structured as a pipe-form member whose cross-sectional shape is circular. The instrument panel reinforcement 14 is disposed with a length direction thereof in the vehicle width direction. Two length direction end portions of the instrument panel reinforcement 14 are fixed to height direction middle portions of an unillustrated pair of left and right front pillars that are provided standing at portions of the two sides of the vehicle body. That is, the instrument panel reinforcement 14 is a body side structural member spanning between the pair of left and right front pillars.

As illustrated in FIG. 2, an outer diameter of the driver seat side of the instrument panel reinforcement 14 is specified to be larger than an outer diameter of the passenger seat side. That is, the driver seat side of the instrument panel reinforcement 14 is a large diameter portion 14A and the passenger seat side is formed as a small diameter portion 14B, such that a section modulus at the driver seat side is larger than a section modulus at the passenger seat side. In FIG. 2, the instrument panel reinforcement 14 is illustrated as being for use in a left-hand drive vehicle. The driver seat side is formed as the large diameter portion 14A and the passenger seat side is formed as the small diameter portion 14B in this manner for the following reason. An unillustrated steering column, which is a heavy object, is to be supported at the driver seat side. Therefore, a high support stiffness is required. In contrast, a passenger airbag device 16 (see FIG. 1) or the like is to be supported at the passenger seat side. Therefore, given that a type of component lighter than the steering column is to be supported, a support stiffness of the same level as at the driver seat side is not required. Considered in this light, the shape and dimensions of the instrument panel reinforcement 14 are specified such that the section modulus at the driver seat side of the instrument panel reinforcement 14 is larger than the section modulus at the passenger seat side.

A driver seat side brace member 18 (see FIG. 2) is set at the driver seat side of the instrument panel reinforcement 14. The driver seat side brace member 18 is configured as a brace member that extends in the vehicle front-rear direction. A substantially middle portion in the front-rear direction of the driver seat side brace member 18 is fixed to an outer periphery surface of the large diameter portion 14A of the instrument panel reinforcement 14 by welding or the like. A cowl inner panel 20 is disposed along the vehicle width direction at the vehicle forward side of the instrument panel reinforcement 14 (see FIG. 1). A front end portion 18A of the driver seat side brace member 18 is fixed to a rear wall portion 20A of the cowl inner panel 20 by a bolt 22 and nut 24 (see FIG. 4).

Meanwhile, a passenger seat side brace member 26 relating to principal portions of the present exemplary embodiment is set at the passenger seat side of the instrument panel reinforcement 14. Herebelow, structures of the passenger seat side brace member 26 are described in detail.

The passenger seat side brace member 26 is configured overall as a long strip-form member with length in the vehicle front-rear direction. The passenger seat side brace member 26 is constituted by a long strip-form front side bracket 28 and a long strip-form rear side bracket 30. The front side bracket 28 is disposed at the vehicle forward side and the rear side bracket 30 is disposed at the vehicle rearward side of the front side bracket 28 in a state of being partially superposed therewith. That is, the passenger seat side brace member 26 is divided into plural components (two components in the present exemplary embodiment), the front side bracket 28 and the rear side bracket 30. The front side bracket 28 and the rear side bracket 30 are both made of metal, and are both fabricated by press-forming.

As illustrated in FIG. 3 to FIG. 6, a cross-sectional shape of the front side bracket 28 taken in the vehicle width direction is an inverted "U" shape opening to the vehicle downward side. The front side bracket 28 is provided with a front end portion 28A, a middle portion 28B and a rear end portion 28C. The front end portion 28A of the front side bracket 28 is inflected from the front end of the middle portion 28B to the vehicle downward side, diagonally to the forward side. The front end portion 28A is fixed by fastening to the rear wall portion 20A of the cowl inner panel 20 with the bolt 22 and nut 24. At the other end, a step 32 is provided between the middle portion 28B and the rear end portion 28C of the front side bracket 28. This step 32 is specified with a depth large enough to accommodate a case nut 38, which is described below. A length of the rear end portion 28C along the vehicle front-rear direction is set to be slightly longer than a front-rear direction dimension of the below-described case nut 38. A circular bolt penetration hole 34 is formed in a central portion of a top wall portion of the rear end portion 28C of the front side bracket 28.

A cross-sectional shape of the rear side bracket 30 in the vehicle width direction is also an inverted "U" shape opening to the vehicle downward side. Similarly to the front side bracket 28, the rear side bracket 30 is provided with a front end portion 30A, a middle portion 30B and a rear end portion 30C. The rear end portion 30C of the rear side bracket 30 includes a portion at which a top wall portion of the middle portion 30B is extended to the vehicle rearward side and is formed into a circular arc shape. The portion formed in this circular arc shape is fixed to the outer periphery surface of the small diameter portion 14B of the instrument panel reinforcement 14 by welding or the like. A slit 36, formed in a linear shape along the vehicle front-rear direction, is provided at a central portion of a top wall portion of the front end portion 30A. The slit 36 opens out at the front end and is closed off at the rear end. A width direction dimension of the front end portion 30A is specified to be narrower than a width direction dimension of the rear end portion 28C of the front side bracket 28. The rear end portion 28C of the front side bracket 28 is covered from the vehicle upward side by the front end portion 30A of the rear side bracket 30. A formation position, slit width and slit length of the bolt penetration hole 34 are respectively specified such that the slit 36 is superposed with the bolt penetration hole 34 of the front side bracket 28 when the rear end portion 28C of the front side bracket 28 is superposed with the front end portion 30A of the rear side bracket 30.

The above-described front side bracket 28 and rear side bracket 30 are fixed by fastening by the case nut 38 and a bolt 40, which serve as a fastening section. Specifically, the case nut 38 is structured as a plate spring made of metal that is formed in a "C" shape in side view. A pair of upper and lower bolt penetration holes 42 are formed in central portions of an upper portion 38A and a lower portion 38B of the case nut 38. A nut portion 38C is provided at the lower portion 38B of the case nut 38 as a welded nut or the like that is coaxial with the bolt penetration holes 42. The case nut 38 is inserted into the top wall portion of the front end portion 30A of the rear side bracket 30, and thereabove the rear end portion 28C of the front side bracket 28 is superposed with the front end portion 30A of the rear side bracket 30 from the vehicle upward side thereof. The bolt 40 is inserted through the bolt penetration hole 34, the bolt penetration hole 42 of the upper portion 38A of the case nut 38, the terminal end of the slit 36, and the bolt penetration hole 42 of the lower portion 38B of the case nut 38, and is threaded into the nut portion 38C. Thus, the rear end portion 28C of the front side bracket 28 and the front end portion 30A of the rear side bracket 30 are fixed by fastening with a predetermined fastening torque.

In the configuration described above, the slit 36, the case nut 38 and the bolt 40 correspond to a relative movement portion, a detachment portion, a fixed fastening state release mechanism and a detachment mechanism of the present invention.

Operations and Effects of the Present Embodiment

Next, operations and effects of the present exemplary embodiment are described.

Figure 4:
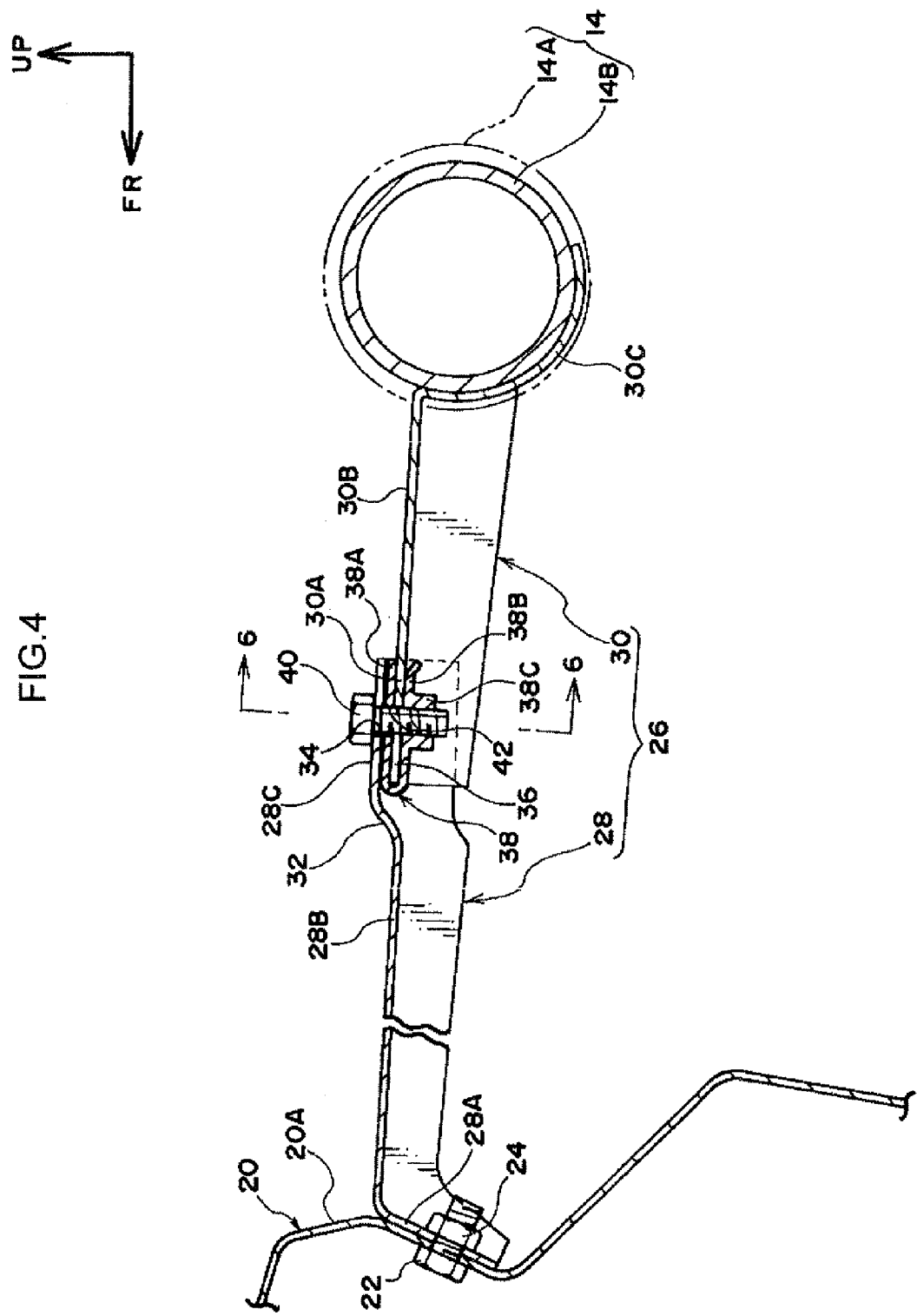
FIG. 4 is a magnified vertical sectional diagram illustrating, magnified, an attached state of the passenger seat side brace member illustrated in FIG. 1.
Figure 5:
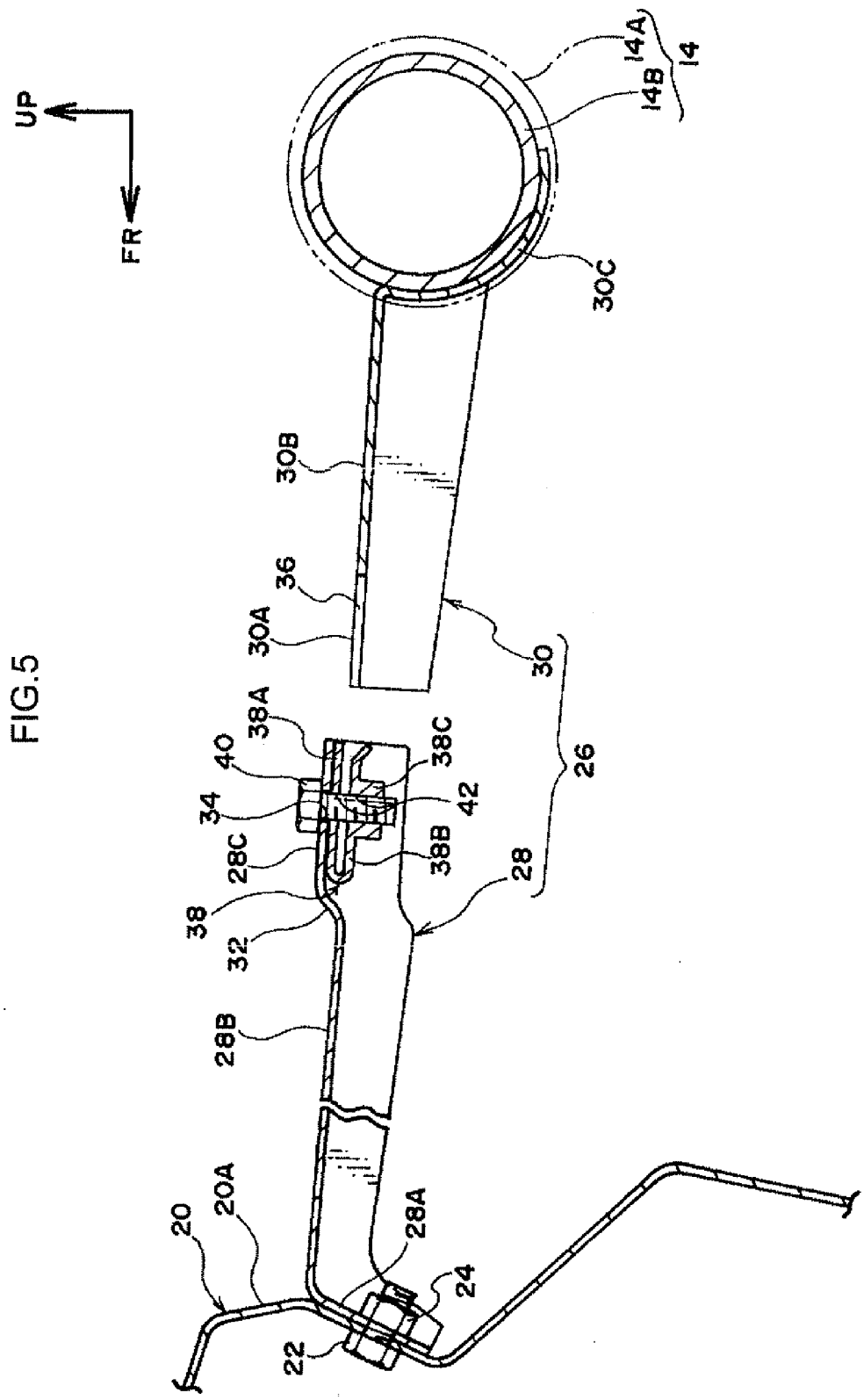
FIG. 5 is a magnified sectional diagram corresponding to FIG. 4, illustrating a state in which, from the state illustrated in FIG. 4, a rear side bracket is detached from a front side bracket.
Figure 6:
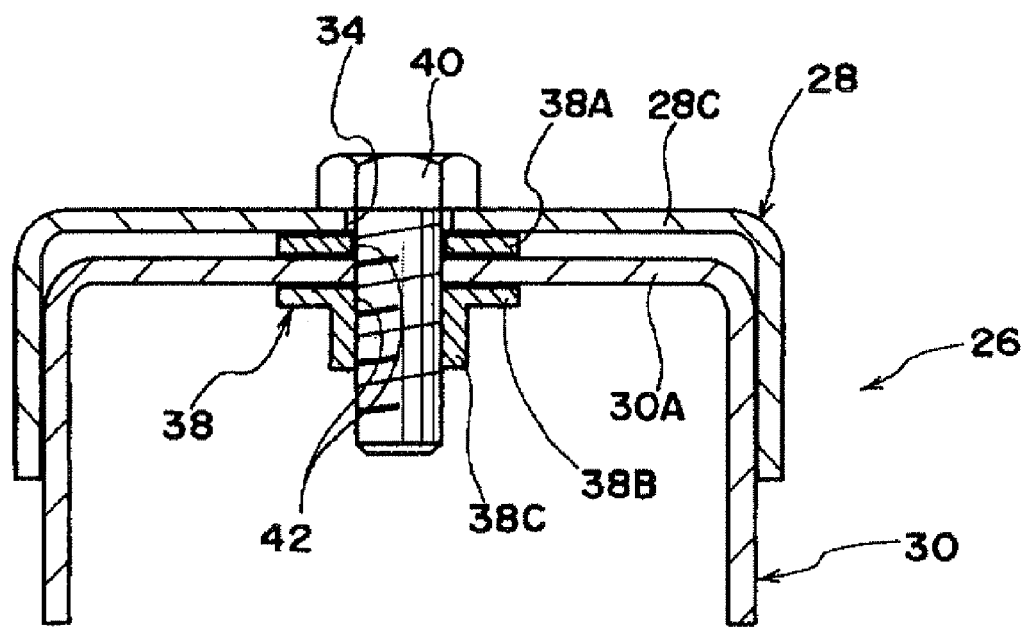
FIG. 6 is a magnified horizontal sectional diagram of the passenger seat side brace member, illustrating a state cut along line 6-6 of FIG. 4.

The states illustrated in FIG. 1 and FIG. 4 are a state before an impact. In this state, the front side bracket 28 and rear side bracket 30 constituting the passenger seat side brace member 26 are in a state of being fixed by fastening by the bolt 40 and the nut portion 38C. The bolt 40 is disposed at the terminal end of the slit 36.

From this state, if there is an offset impact at the driver seat side, a large load is inputted at the driver seat side of a front portion of the vehicle body. Specifically, an impact load is inputted from a front bumper reinforcement to a front side member disposed at the driver seat side, and then the impact load is transmitted to the front pillar disposed at the driver seat side. In addition, at the engine compartment, a load is transmitted from the front bumper reinforcement to a stiff body such as the engine or the like, and then the impact load is transmitted to the dash panel and the cowl or the like. When these loads are transmitted, the body deforms and a predetermined energy absorption is realized.

An impact load F when an offset impact is inputted to the driver seat side of the vehicle front portion as described above (see FIG. 2) is transmitted to the large diameter portion 14A (the driver seat side) of the instrument panel reinforcement 14. As a result, the large diameter portion 14A of the instrument panel reinforcement 14 is pushed to the vehicle rearward side and displaces to the vehicle rearward side. However, because the cowl inner panel 20 is connected to the large diameter portion 14A of the instrument panel reinforcement 14 by the driver seat side brace member 18, a backward movement amount of the large diameter portion 14A of the instrument panel reinforcement 14 to the vehicle rearward side is moderated.

When this offset impact occurs, not a great amount of the impact load is inputted at the passenger seat side of the vehicle front portion. However, because the large diameter portion 14A and small diameter portion 14B of the instrument panel reinforcement 14 are linked, the small diameter portion 14B of the instrument panel reinforcement 14 is pulled to the vehicle rearward side by the large diameter portion 14A moving backward by a predetermined amount to the vehicle rearward side. Because the small diameter portion 14B of the instrument panel reinforcement 14 and the cowl inner panel 20 are connected in the vehicle front-rear direction by the passenger seat side brace member 26, when the small diameter portion 14B is pulled to the vehicle rearward side, the rear side bracket 30 of the passenger seat side brace member 26 is also pulled to the vehicle rearward side.

When a tension load f acting on the passenger seat side brace member 26 at this time (see FIG. 1) exceeds the fastening torque of the bolt 40, the slit 36 of the rear side bracket 30 relatively moves to the vehicle rearward side with respect to the bolt 40. Then, when the state of engagement between the bolt 40 and the slit 36 is released, the rear side bracket 30 is detached from the front side bracket 28. As a result, the occurrence of an excessive concentration of stress at a boundary portion between the small diameter portion 14B and large diameter portion 14A of the instrument panel reinforcement 14, causing a large deformation, is suppressed. In other words, according to the present exemplary embodiment, deformation of the instrument panel reinforcement may be effectively suppressed even if there is a difference in magnitudes of impact loads that are inputted at the driver seat side and the passenger seat side of the instrument panel reinforcement 14.

In the present exemplary embodiment as described above, the passenger seat side brace member 26 is divided into two components, the front side bracket 28 and the rear side bracket 30, and the two are detachably joined. Therefore, after the tension load f of at least the predetermined value has acted on the passenger seat side brace member 26 and the rear side bracket 30, which is at the side of the direction of action of the tension load f, has detached from the vehicle body (that is, from the front side bracket 28 fixed to the rear wall portion 20A of the cowl inner panel 20), no load is transmitted from the large diameter portion 14A (the driver seat side) of the instrument panel reinforcement 14 to the small diameter portion 14B (the passenger seat side). Therefore, deformation does not occur at the boundary portion between the two. Thus, according to the present exemplary embodiment, deformation of the instrument panel reinforcement 14 may be effectively suppressed even if there is a difference in magnitudes of impact loads that are inputted to the large diameter portion 14A (the driver seat side) and the small diameter portion 1413 (the passenger seat side) of the instrument panel reinforcement 14.

When the passenger airbag device 16 provided at the passenger seat side of the instrument panel 12 (see FIG. 1) operates during an offset impact or the like and a passenger seat airbag is deployed by inflation, a space between the passenger seat airbag and an occupant is narrowed. Therefore, occupant restraint performance by the passenger seat airbag may be improved.

Furthermore, the front side bracket 28 and rear side bracket 30 are fixed by fastening with the bolt 40 and the nut portion 38C, and the rear side bracket 30 is detached from the front side bracket 28 when the fastening load is exceeded. Therefore, a load at which the small diameter portion 14B of the instrument panel reinforcement 14 is relatively moved toward the vehicle rearward side is determined by the fastening load of the bolt 40 and nut portion 38C. Thus, what magnitude of tension load acting on the fastening portion of the passenger seat side brace member 26 causes the small diameter portion 14B of the instrument panel reinforcement 14 to relatively move to the vehicle rearward side may be altered by the fastening load of the bolt 40 and nut portion 38C being changed. Therefore, according to the present exemplary embodiment, there is an excellent effect in that a load at which the small diameter portion 14B of the instrument panel reinforcement 14 is relatively moved to the vehicle rearward side is easy to adjust. Furthermore, when a detachment structure is employed, an effect of assembly errors (fabrication errors) of the instrument panel reinforcement 14 being absorbed may be expected.

The detachment structure of the passenger seat side brace member 26 described above does not involve breakage of a member. Therefore, the detachment operation may be controlled only by the fastening load of the bolt 40 and nut portion 38C. Therefore, according to the present exemplary embodiment, inconsistency in a detachment load at which the rear side bracket 30 is detached from the front side bracket 28 is unlikely to occur.

In the detachment mechanism described above, the slit 36 is formed in the rear side bracket 30, and the rear side bracket 30 starts to slip toward the vehicle rearward side with respect to the front side bracket 28 when the slit 36 relatively moves with respect to the bolt 40. Then, when the slit 36 passes the bolt 40, the rear side bracket 30 is detached from the front side bracket 28. Thus, in the present exemplary embodiment, because the detachment mechanism is configured to include the slit 36, the structure may be kept relatively simple and consequently high reliability may be provided.

Second Exemplary Embodiment

Figure 7:
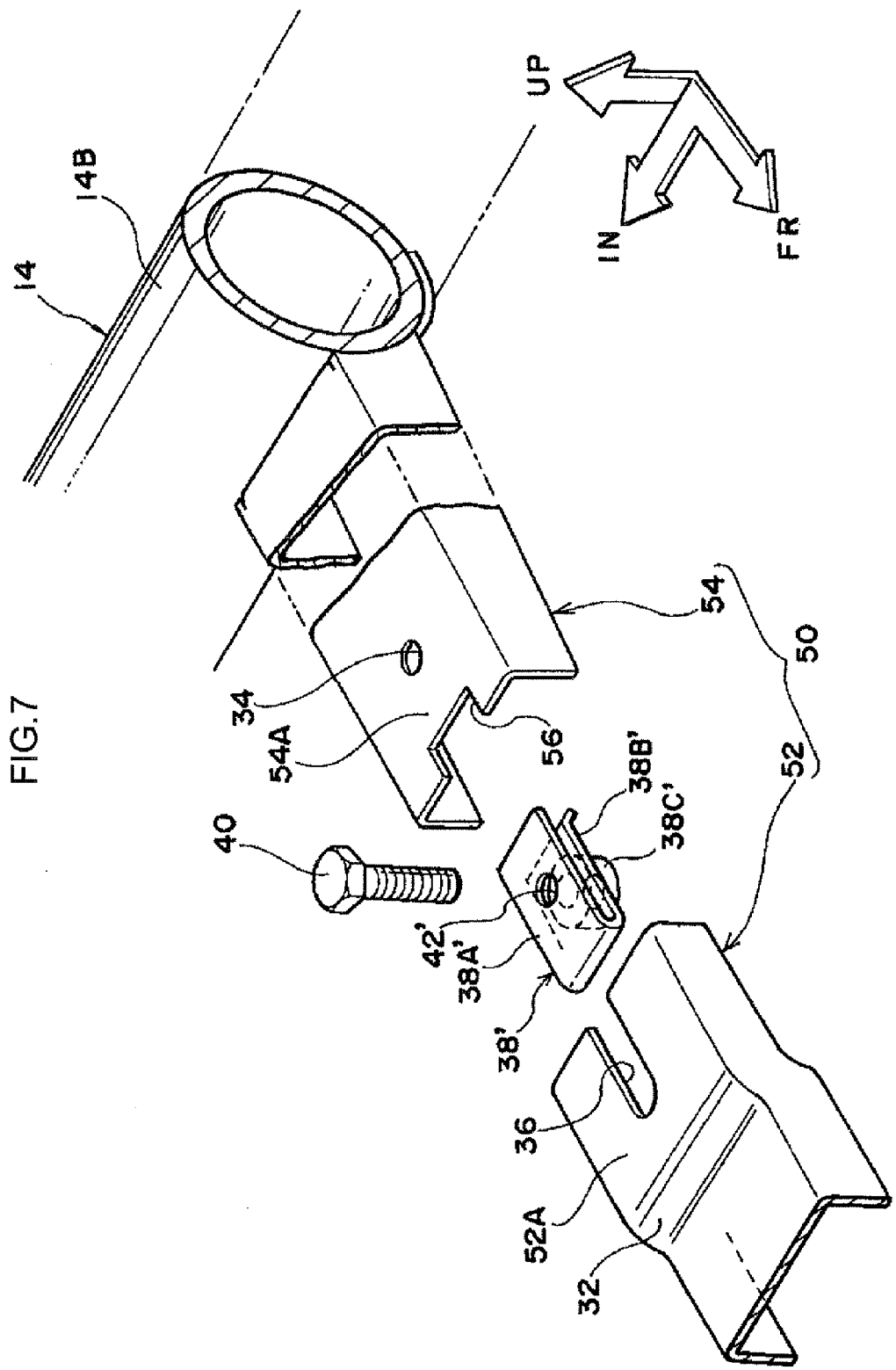
FIG. 7 is an exploded perspective diagram corresponding to FIG. 3, illustrating, magnified, a joining portion of a passenger seat side brace member relating to a second exemplary embodiment.
Figure 8:
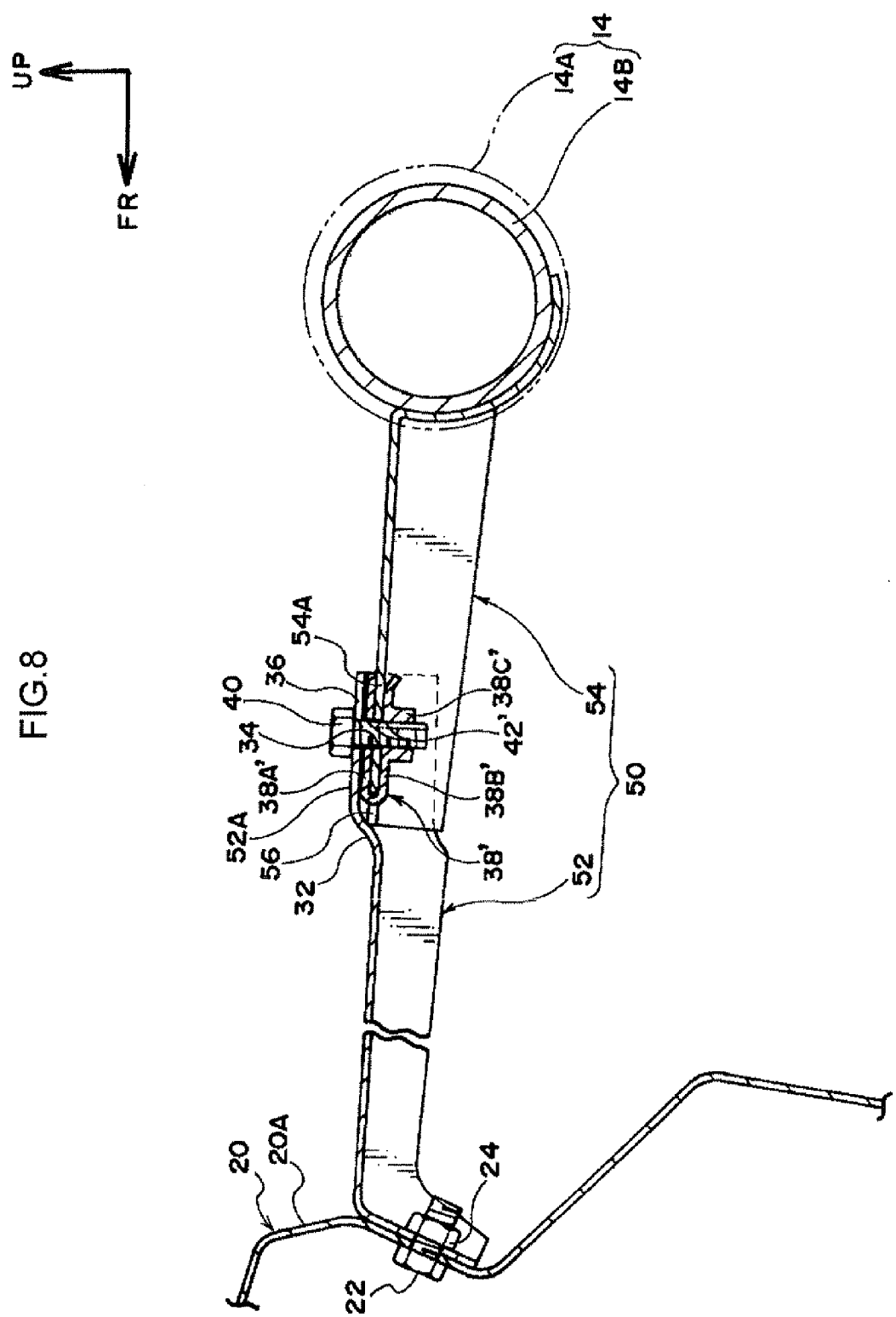
FIG. 8 is a vertical sectional diagram illustrating an attached state of the passenger seat side brace member illustrated in FIG. 7.
Figure 9:
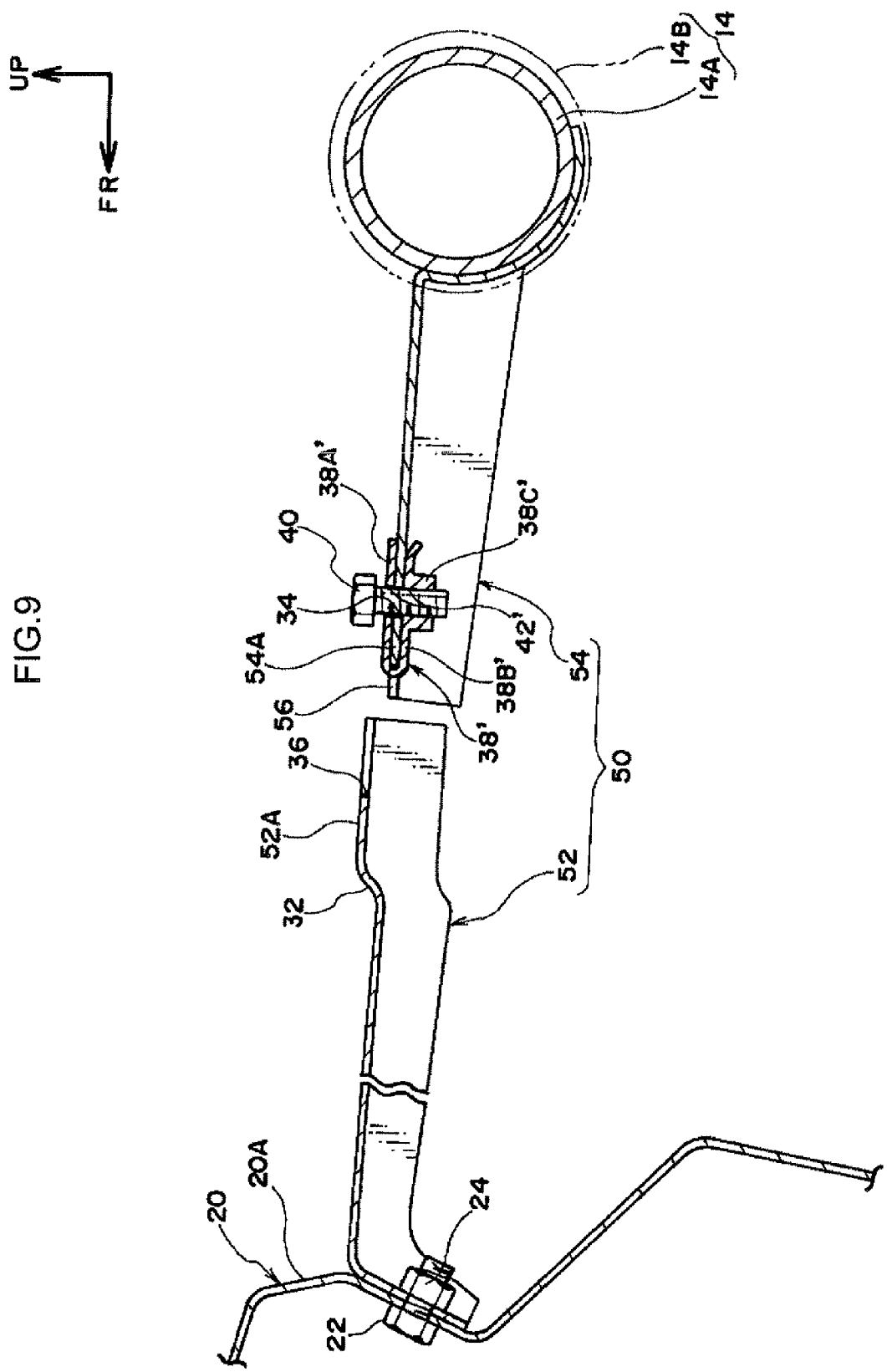
FIG. 9 is a sectional diagram corresponding to FIG. 8, illustrating a state in which, from the state illustrated in FIG. 8, a rear side bracket is detached from a front side bracket.

Herebelow, a second exemplary embodiment of the vehicle instrument panel reinforcement attachment structure relating to the present invention is described using FIG. 7 to FIG. 9. Structural portions that are the same as in the first exemplary embodiment described above are assigned the same reference numerals and descriptions thereof are not given.

As illustrated in FIG. 7 and FIG. 8, in the second exemplary embodiment too, similarly to the above-described first exemplary embodiment, a passenger seat side brace member 50 is divided into two front and rear components, a front side bracket 52 and a rear side bracket 54. However, while the slit 36 is formed in the front end portion 30A of the rear side bracket 30 of the first exemplary embodiment, in the second exemplary embodiment the slit 36 is formed in a rear end portion 52A of the front side bracket 52. In correspondence therewith, a case nut 38' is set at a front end portion 54A of the rear side bracket 54. The case nut 38' is configured as a component with a smaller width direction dimension than the case nut 38 described in the first exemplary embodiment, but the configuration of the portions is the same. Therefore, an apostrophe is appended to the reference numerals of the respective portions of the case nut 38 described in the first exemplary embodiment and descriptions thereof are not given.

A rectangular incision 56 is formed at the middle of an end portion of the front end portion 54A of the rear side bracket 54. An incision width of the rectangular incision 56 is specified to be slightly wider than the width of the case nut 38', so as to allow insertion of the case nut 38'. Thus, mispositioning of the case nut 38' in the vehicle width direction is prevented. The bolt penetration hole 34 is again formed in the front end portion 54A of the rear side bracket 54. The case nut 38' is inserted from the vehicle forward side into the rectangular incision 56 of the front end portion 54A of the rear side bracket 54, and the rear end portion 52A of the front side bracket 52 is covered from above by the front end portion 54A of the front side bracket 52. The terminal end of the slit 36, the bolt penetration holes 42', the bolt penetration hole 34 and the nut portion 38C are disposed on the same axis, and the bolt 40 is inserted therein, in that order, and threaded into the nut portion 38C'. Thus, the front side bracket 52 and the rear side bracket 54 are detachably fastened and fixed.

In the configuration described above, the slit 36, the case nut 38' and the bolt 40 correspond to the relative movement portion, the detachment portion, the fixed fastening state release mechanism and the detachment mechanism of the present invention.

Operations and Effects

According to the configuration described above, an impact load caused by an offset impact is transmitted to the passenger seat side brace member 50 via the instrument panel reinforcement 14, and the rear side bracket 54 is pulled to the vehicle rearward side. If a tension load at this time exceeds the fastening load of the bolt 40 and nut portion 38C', then as illustrated in FIG. 9, the bolt 40 slides (relatively moves) to the vehicle rearward side along the slit 36, with the terminal end of the slit 36 formed in the front side bracket 52 as the start point, and the bolt 40 proceeds to disengage from the slit 36. Thus, the rear side bracket 54 is detached from the front side bracket 52. Operations thereafter are the same as in the first exemplary embodiment described above. Therefore, the same operations and effects as in the first exemplary embodiment are provided.

Third Exemplary Embodiment

Figure 10:
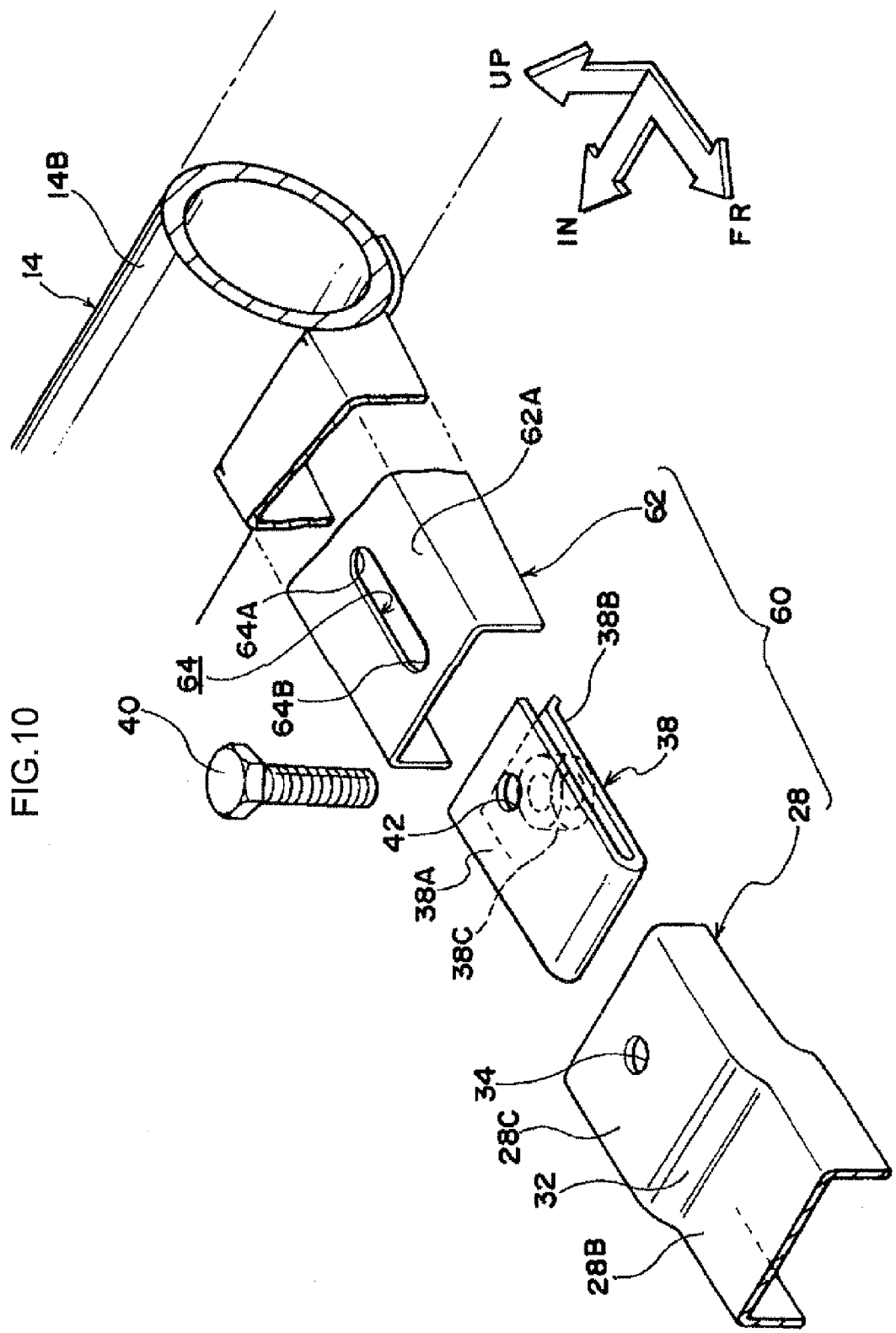
FIG. 10 is an exploded perspective diagram corresponding to FIG. 3, illustrating, magnified, a joining portion of a passenger seat side brace member relating to a third exemplary embodiment.
Figure 11:
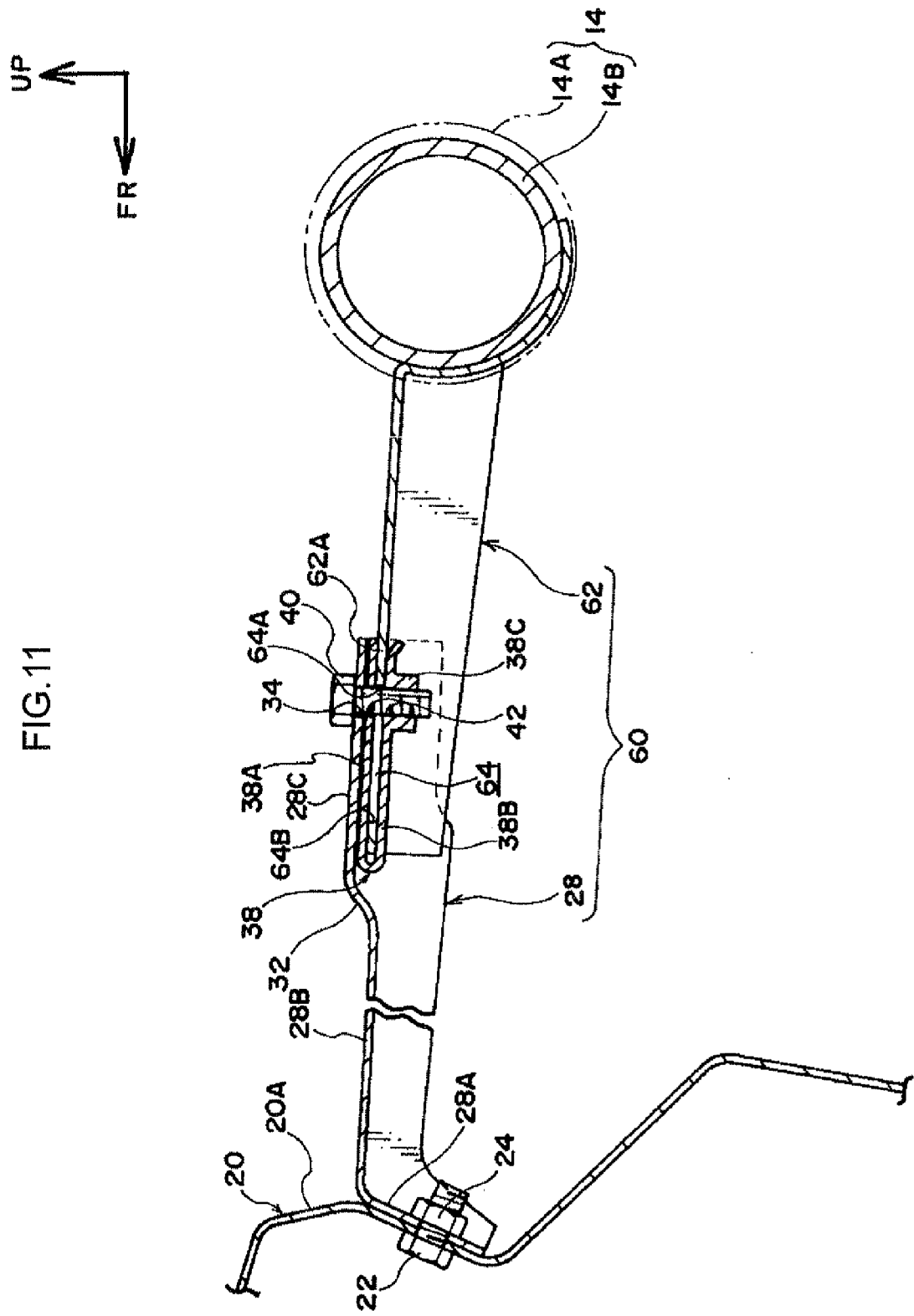
FIG. 11 is a vertical sectional diagram illustrating an attached state of the passenger seat side brace member illustrated in FIG. 10.
Figure 12:
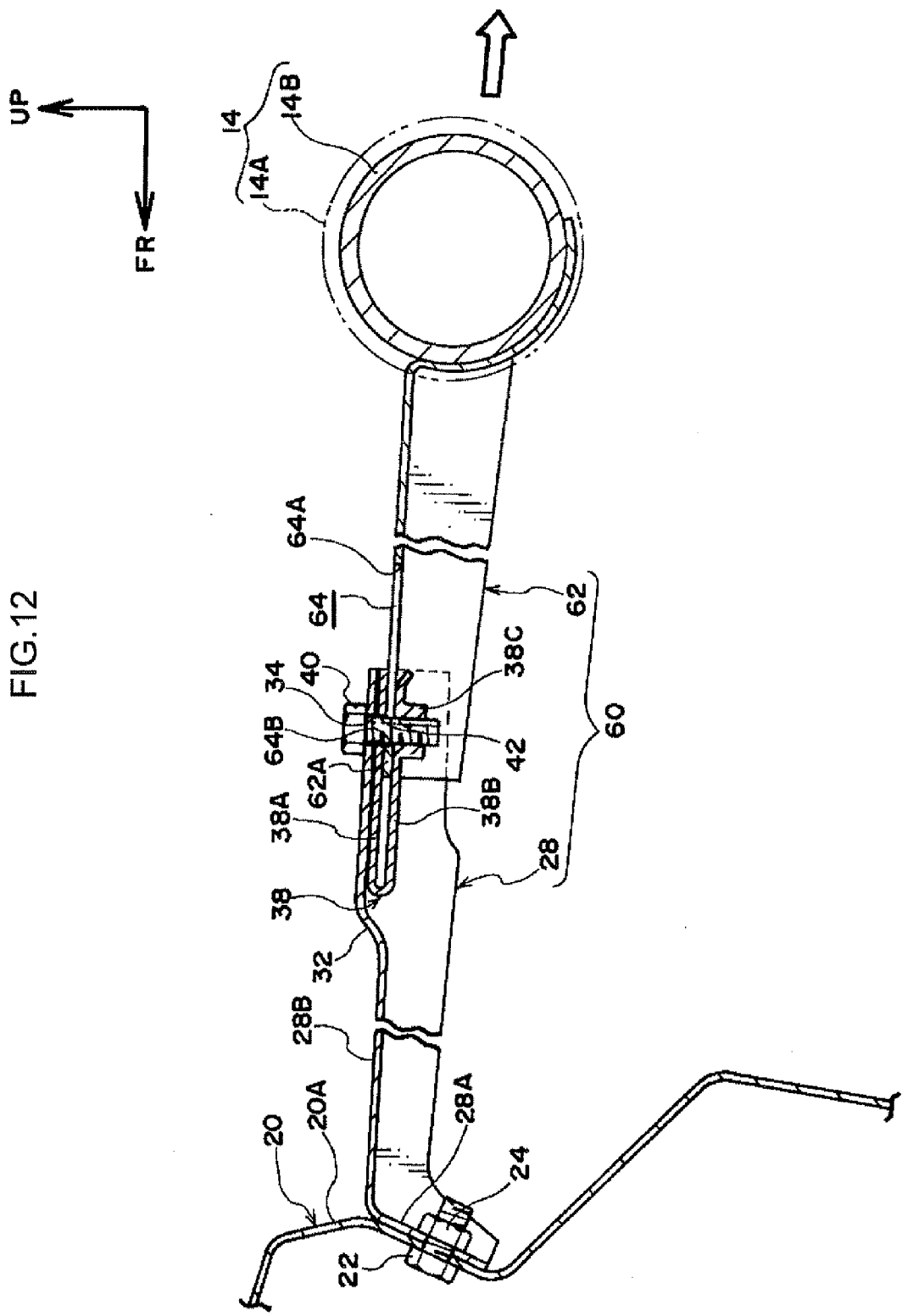
FIG. 12 is a sectional diagram corresponding to FIG. 11, illustrating a state in which, from the state illustrated in FIG. 11, a rear side bracket is relatively moved to the vehicle rearward side with respect to a front side bracket.

Herebelow, a third exemplary embodiment of the vehicle instrument panel reinforcement attachment structure relating to the present invention is described using FIG. 10 to FIG. 12. Structural portions that are the same as in the first exemplary embodiment described above are assigned the same reference numerals and descriptions thereof are not given.

As illustrated in FIG. 10 and FIG. 11, in the third exemplary embodiment too, similarly to the above-described first exemplary embodiment, a passenger seat side brace member 60 is divided into two front and rear components, the front side bracket 28 and a rear side bracket 62. However, this third exemplary embodiment is characterized by a long hole 64 being formed, rather than the slit 36 being formed, in the rear side bracket 62.

Specifically, the long hole 64 is formed in a linear shape whose length direction is the vehicle front-rear direction at a middle portion of a front end portion 62A of the rear side bracket 62. The rear end of the long hole 64 is a start end portion 64A, and a front end of the long hole 64 is a terminal end portion 64B. A width direction dimension of the long hole 64 is specified with a dimension enabling insertion of the bolt 40, and is specified to be slightly wider than an outer diameter of the shaft of the bolt 40. In an assembled state, the front side bracket 28 and the rear side bracket 62 are fastened and fixed by the bolt 40 and the nut portion 38C of the case nut 38 at the start end portion 64A of the long hole 64.

In the configuration described above, the long hole 64, the case nut 38 and the bolt 40 correspond to the relative movement portion and the extending structure portion of the present invention.

Operations and Effects

According to the configuration described above, the state illustrated in FIG. 11 is a state before an offset impact. In this state, the bolt 40 is disposed at the start end portion 64A of the long hole 64. From this state, when there is an offset impact at the driver seat side, the offset impact is inputted to the large diameter portion 14A of the instrument panel reinforcement 14 via the driver seat side brace member 18. The load inputted to the large diameter portion 14A is transmitted to the small diameter portion 14B at the same time as pushing the large diameter portion 14A to the vehicle rearward side, and pulls the rear side bracket 62 of the passenger seat side brace member 26 to the vehicle rearward side. Then, if the tension load acting on the rear side bracket 62 exceeds the fastening load of the bolt 40 and nut portion 38C, the long hole 64 is relatively moved toward the vehicle rearward side with respect to the bolt 40. Therefore, the rear side bracket 62 slides to the vehicle rearward side with respect to the front side bracket 28, and the passenger seat side brace member 60 extends to the vehicle rearward side. Then, when the bolt 40 reaches the terminal end portion 64B of long hole 64, the long hole 64 may not relatively move any further to the vehicle rearward side with respect to the bolt 40, and the sliding movement of the rear side bracket 62 to the vehicle rearward side with respect to the front side bracket 28 is stopped. Thus, the rear side bracket 62 may be extended with respect to the front side bracket 28 by a distance corresponding to the length direction dimension of the long hole 64, and deformation at the boundary portion between the large diameter portion 14A and the small diameter portion 14B of the instrument panel reinforcement 14 is suppressed or prevented.

Thus, in the present exemplary embodiment too, the same operations and effects as in the first exemplary embodiment described above are obtained. In addition, in the case of the present exemplary embodiment, the rear side bracket 62 does not detach from the front side bracket 28 but is joined to the cowl inner panel 20 via the driver seat side brace member 18. Therefore, there is an advantage in that a change in attitude after the passenger seat side of the instrument panel reinforcement 14 (the small diameter portion 14B) has relatively moved to the vehicle rearward side is small.

Furthermore, because the slit 36 is simply replaced with the long hole 64, similarly to when the slit 36 is used, the structure may be kept relatively simple and consequently high reliability may be provided.

In addition, when the long hole 64 is used, how far the rear side bracket 62 is relatively moved with respect to the front side bracket 28 may be arbitrarily altered by the length direction dimension of the long hole 64.

A further configuration is possible in which the width of a portion of the long hole 64 after the start end portion 64A is narrowed to form a narrow groove, and when the bolt 40 is relatively moving from the start end portion 64A to the terminal end portion 64B, the bolt 40 tears open the groove. In this case, an energy absorption effect is provided.

In the configuration described above, a structure is employed in which the long hole 64 is formed in the rear side bracket 62 and the long hole 64 slides with respect to the bolt 40 that is provided at the front side bracket 28. However, this is not to be limiting; the converse is also possible. That is, a bolt may be provided at a rear side bracket and a long hole formed in a front side bracket, and the rear side bracket extended with respect to the front side bracket by the bolt sliding in the long hole from a start end portion to a terminal end portion.

Other configurations in which a passenger seat side brace member is extended may be employed, beside the configuration in which the long hole 64 is formed in the rear side bracket 62 and the rear side bracket 62 is relatively moved with respect to the front side bracket 28 through a range of the length of the long hole 64 as in the structure described above. For example, a horizontal cross-section of a front side bracket taken along the vehicle width direction may be formed in a substantial "C" shape, a rear side bracket with the same cross-sectional form but a size smaller may be inserted by a predetermined amount into the front side bracket, and the two superposed portions may be joined by a shear pin. The shear pin may break when a tension load toward the vehicle rearward side reaches a predetermined value, and the rear side bracket may protrude to the vehicle rearward side from the front side bracket.

Fourth Exemplary Embodiment

Herebelow, a fourth exemplary embodiment of the vehicle instrument panel reinforcement attachment structure relating to the present invention is described using FIG. 13 to FIG. 17. Structural portions that are the same as in the first exemplary embodiment described above are assigned the same reference numerals and descriptions thereof are not given.

Figure 13:
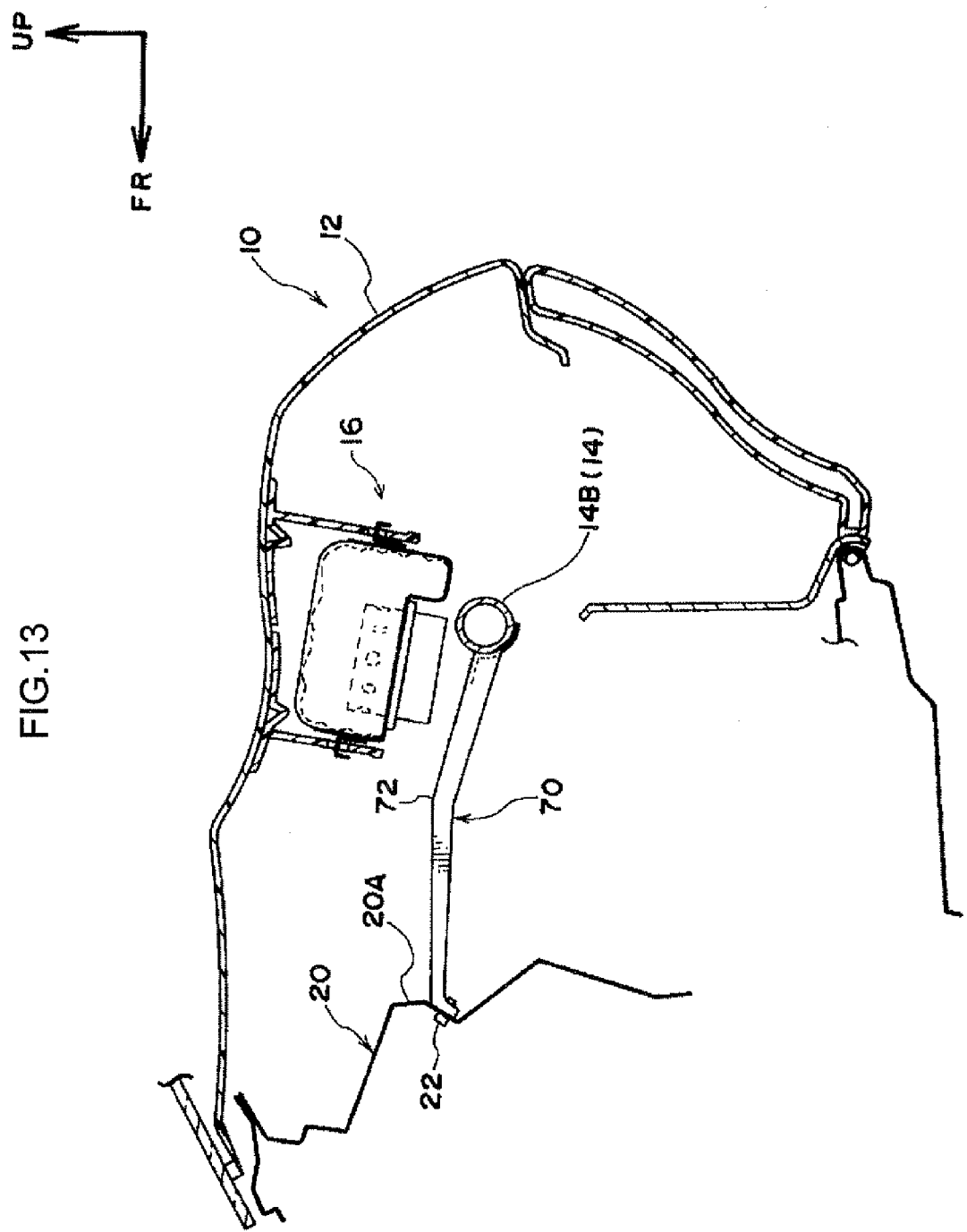
FIG. 13 is a vertical sectional diagram of the passenger seat side of an instrument panel module employing a vehicle instrument panel reinforcement attachment structure relating to a fourth exemplary embodiment.
Figure 14:
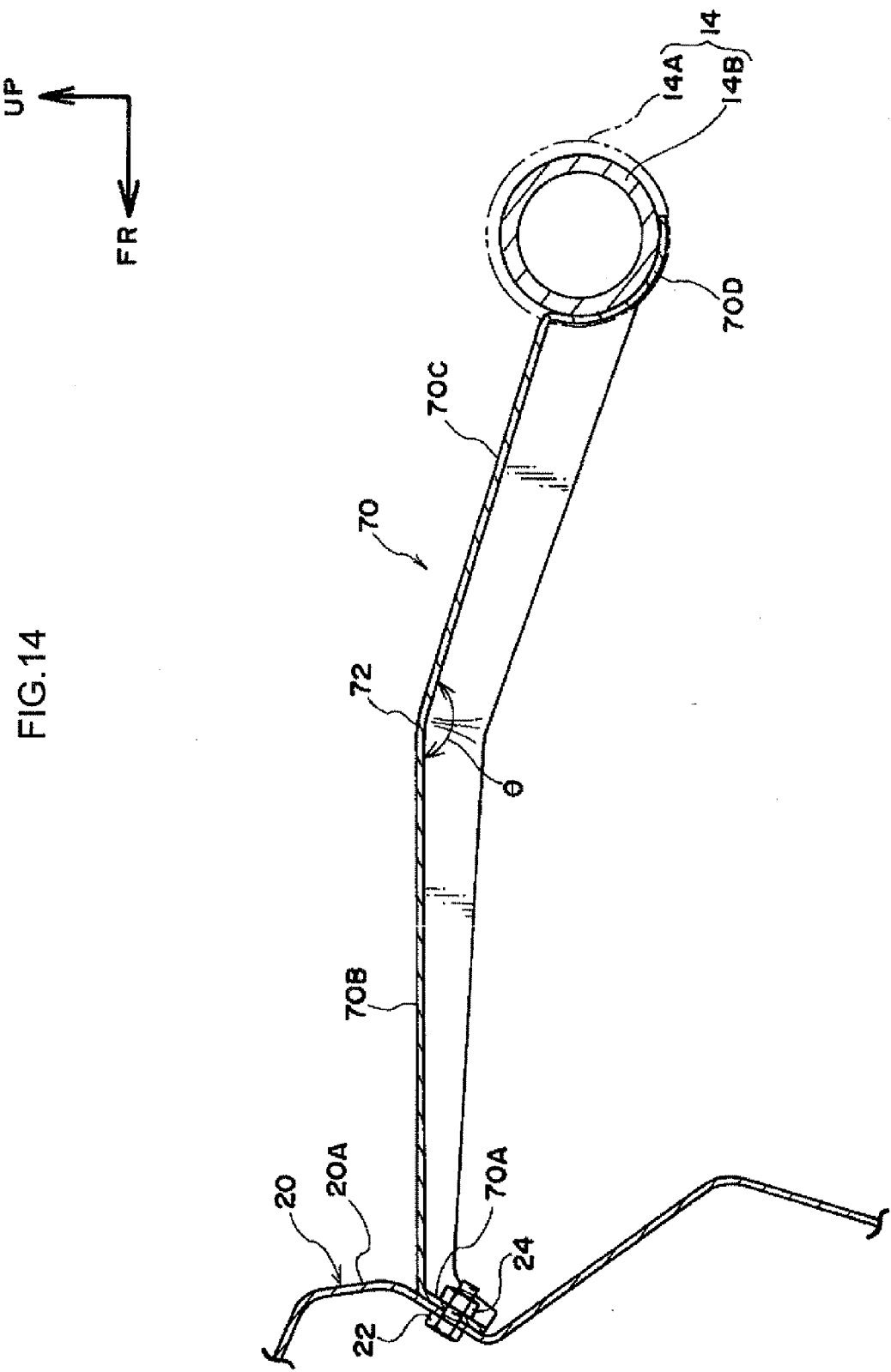
FIG. 14 is a magnified vertical sectional diagram illustrating, magnified, an attached state of the passenger seat side brace member illustrated in FIG. 13.

As illustrated in FIG. 13 and FIG. 14, the fourth exemplary embodiment, differently from the above-described first to third exemplary embodiments, is characterized by a passenger seat side brace member 70 being constituted by a single component.

Specifically, the passenger seat side brace member 70 is structured as a long strip-form member whose length is in the vehicle front-rear direction. A vertical cross-sectional shape of the passenger seat side brace member 70 taken along the vehicle width direction is an inverted U-shape opening to the vehicle downward side. The passenger seat side brace member 70 is made of metal and is fabricated by press-forming.

As illustrated in FIG. 14, the passenger seat side brace member 70 is provided with a front end portion 70A, a front portion 70B, a rear portion 70C and a rear end portion 70D. The front end portion 70A is inflected to the vehicle downward side, diagonally to the forward side, from a front end of the front portion 70B. The front end portion 70A is fixed by fastening with the bolt 22 and nut 24 to the rear wall portion 20A of the cowl inner panel 20. The rear end portion 70D includes a portion at which a top wall portion of the rear portion 70C is extended to the vehicle rearward side and formed in a circular arc shape. The portion formed in this circular arc shape is fixed to the outer periphery surface of the small diameter portion 14B of the instrument panel reinforcement 14 by welding or the like.

A length direction middle portion of the passenger seat side brace member 70 described above (a boundary portion between the front portion 7013 and the rear portion 70C) is formed in an inverted "V" shape protruding to the vehicle upward side in a vehicle side view. An internal angle θ of an inflected portion 72 of the passenger seat side brace member 70 is specified to be an obtuse angle that is larger than 90° and smaller than 180° (more specifically, in a range from θ=165° to 150°).

In the configuration described above, the inflected portion 72 corresponds to the extending structure portion of the present invention.

Operations and Effects

Figure 15:
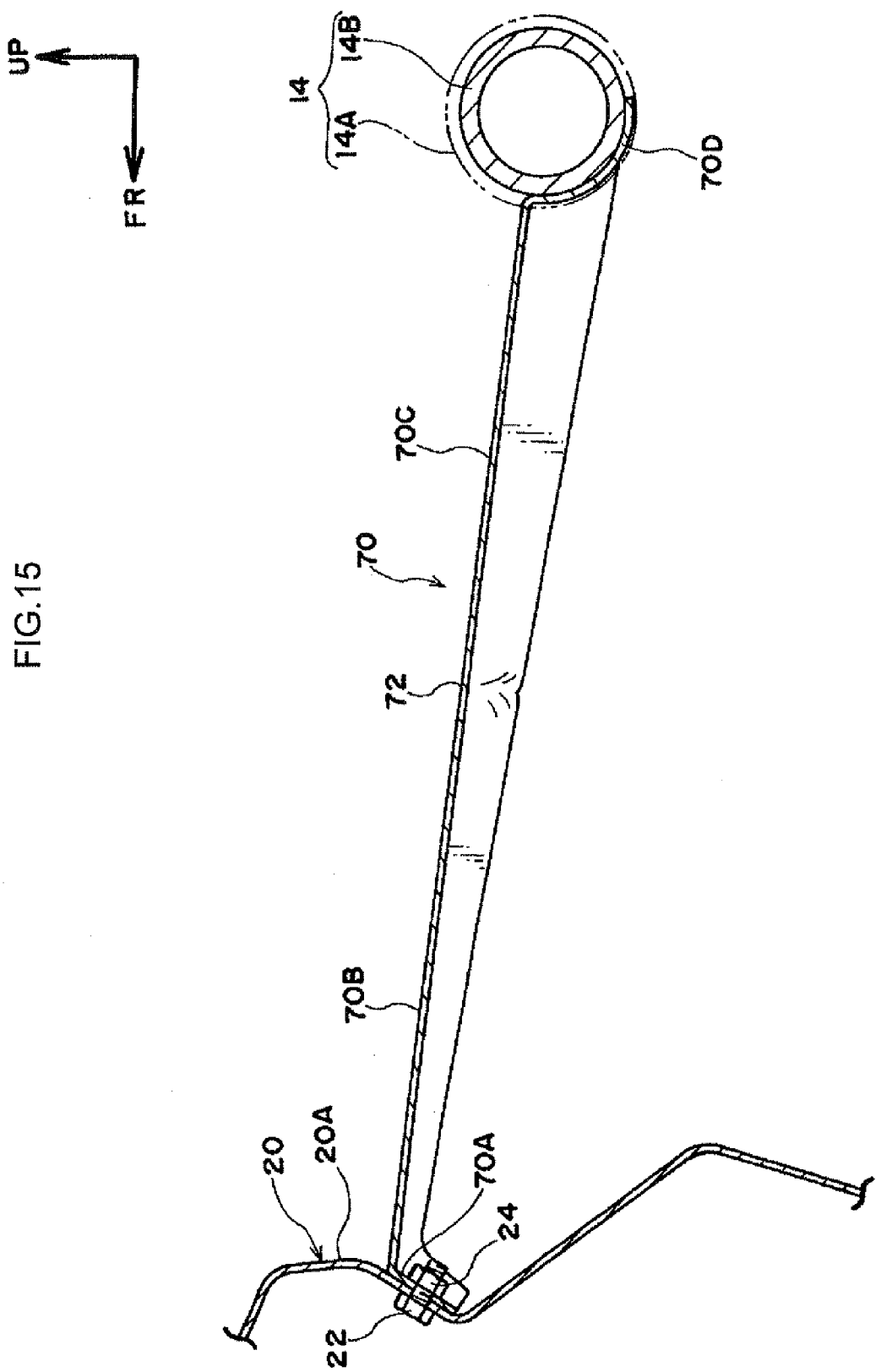
FIG. 15 is a magnified sectional diagram corresponding to FIG. 14, illustrating a state in which, from the state illustrated in FIG. 14, the passenger seat side brace member is extended to a straight line shape.

According to the configuration described above, the state illustrated in FIG. 14 is a state before an offset impact. In this state, the passenger seat side brace member 70 retains its original inverted "V" shape. From this state, when there is an offset impact at the driver seat side, the offset impact is inputted to the large diameter portion 14A of the instrument panel reinforcement 14 via the driver seat side brace member 18. The load inputted to the large diameter portion 14A is transmitted to the small diameter portion 14B at the same time as pushing the large diameter portion 14A to the vehicle rearward side, and pulls the rear portion 70C of the passenger seat side brace member 70 to the vehicle rearward side. In consequence, as illustrated in FIG. 15, the passenger seat side brace member 70 is plastically deformed to a straight line shape. Thus, the passenger seat side brace member 70 is extended to the vehicle rearward side. As a result, deformation at the boundary portion between the large diameter portion 14A and the small diameter portion 14B of the instrument panel reinforcement 14 is suppressed or prevented.

Thus, in the present exemplary embodiment too, the same operations and effects as in the first exemplary embodiment described above are provided. In addition, in the case of the present exemplary embodiment, because the passenger seat side brace member 70 is structured by a single component, the number of components may be reduced in comparison with a case in which a plural number of members are joined to structure a passenger seat side brace member. As a result, costs of the passenger seat side brace member 70 may be reduced.

Figure 16:
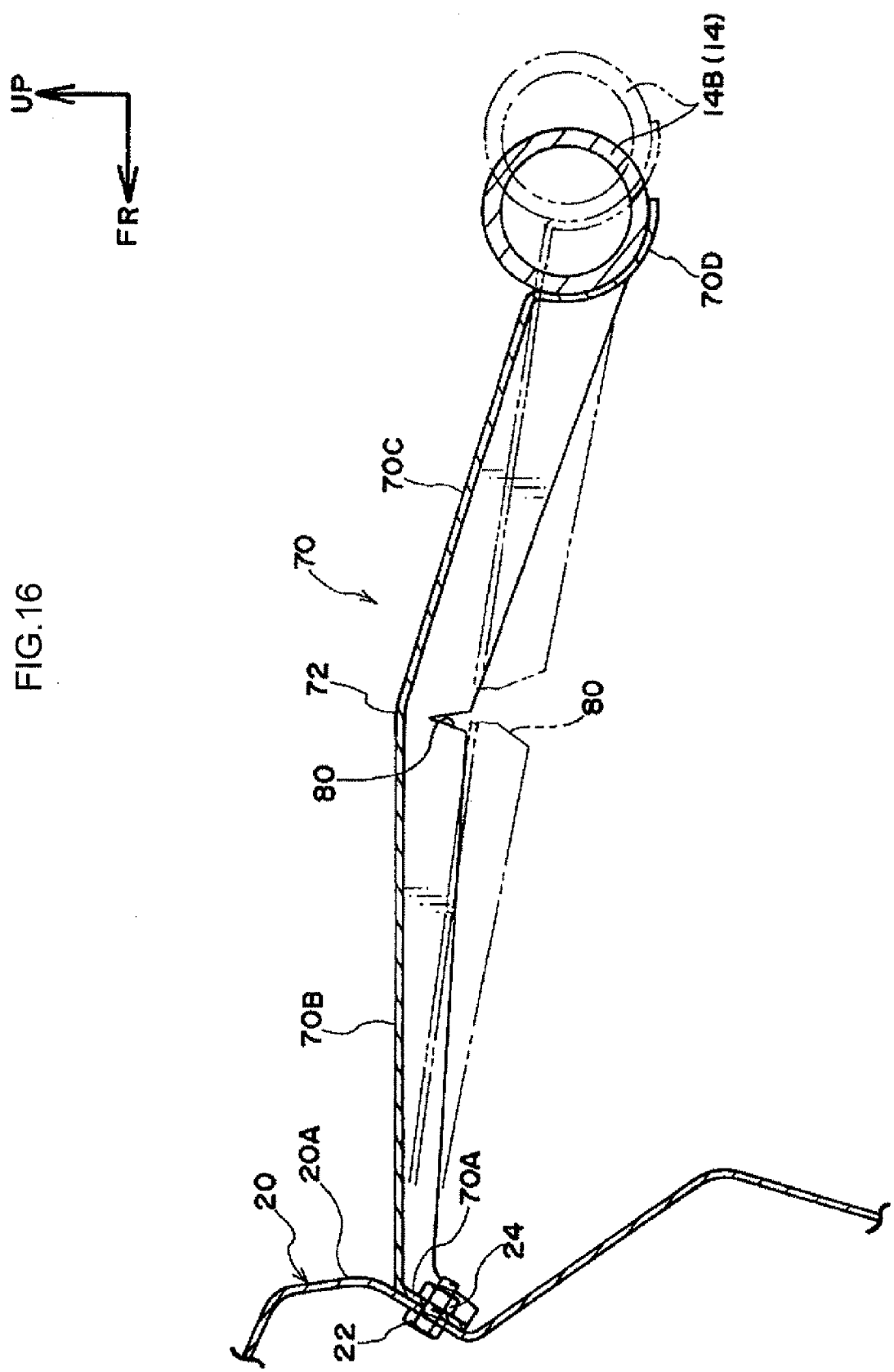
FIG. 16 is a magnified vertical sectional diagram corresponding to FIG. 14, illustrating states before and after deformation of a passenger seat side brace member relating to a variant example.
Figure 17:
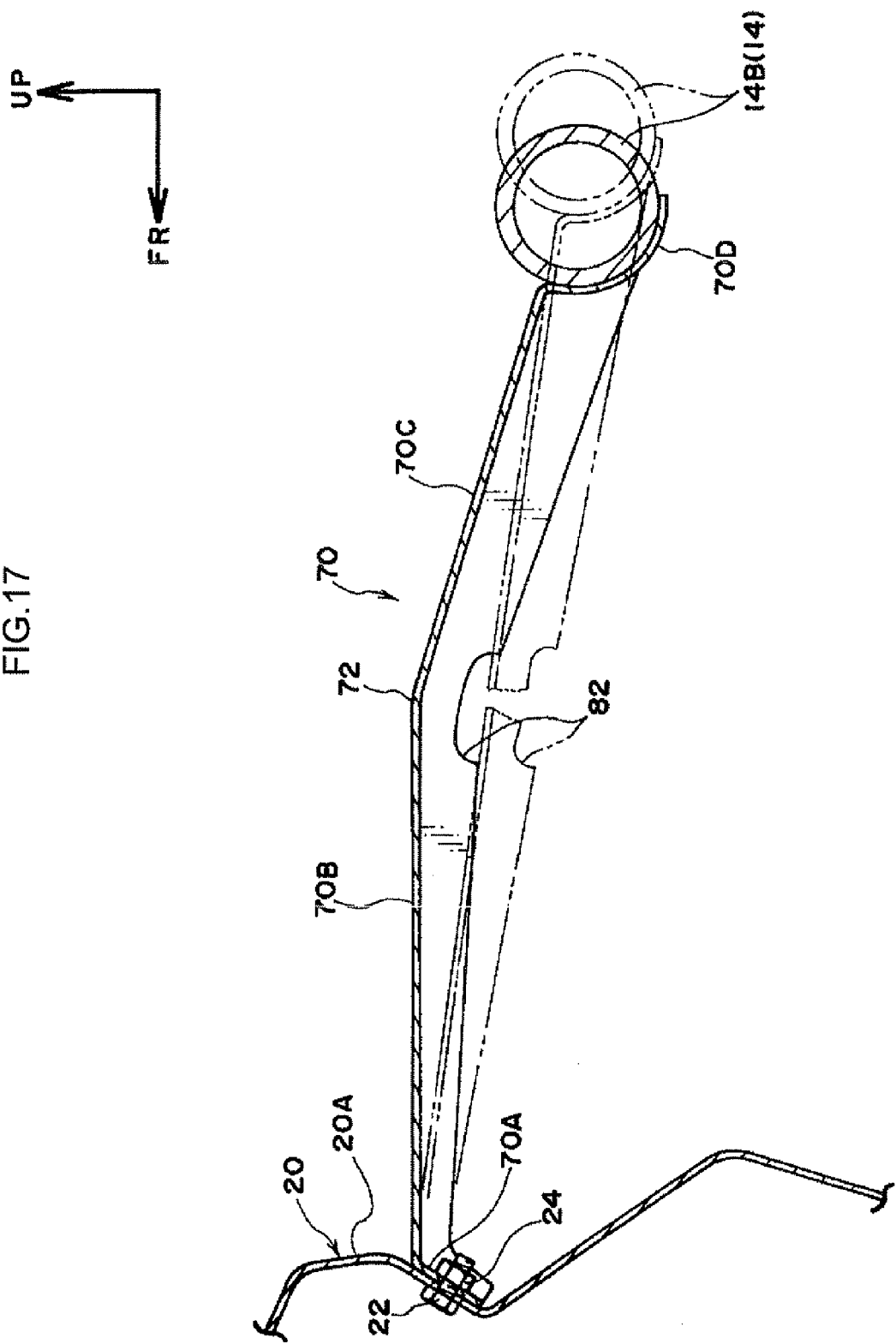
FIG. 17 is a magnified vertical sectional diagram corresponding to FIG. 16, illustrating states before and after deformation of a passenger seat side brace member relating to another variant example.

In the configuration described above, no deliberate weakening portion is specified in the vicinity of the inflected portion 72 of the passenger seat side brace member 70, but this is not to be limiting. As illustrated in FIG. 16 and FIG. 17, a weakening portion may be specified at a predetermined location of the passenger seat side brace member such that the passenger seat side brace member may be broken. For example, in the example illustrated in FIG. 16, an incision 80 is formed to serve as a weakening portion in an inverted "V" shape in the vehicle side view, at a lower edge portion that is disposed below the inflected portion 72 of the portions at the two ends of the passenger seat side brace member 70. In a further example illustrated in FIG. 17, an incision 82 with a long hole form in the vehicle side view, which is long and narrow in the vehicle front-rear direction, is formed at a lower edge portion that is disposed below the inflected portion 72 of the portions at the two ends of the passenger seat side brace member 70.

In the configuration described above, the inflected portion 72 and the incisions 80 and 82 correspond to the relative movement portion and the detachment portion of the present invention. That is, these variant examples are not of types in which two components are caused to detach by separating as in the first exemplary embodiment and second exemplary embodiment described above, but of types in which one component is caused to detach by breaking and separating. Beside the incisions 80 and 82 illustrated in FIG. 16 and FIG. 17, configurations may be employed in which reduced thickness portions are provided to serve as weakening portions, or openings are specified or the like.

According to the variant examples with the configurations described above, in each of the variant examples, the passenger seat side brace member 70 is plastically deformed into a straight line shape, as shown by two-dot chain lines in FIG. 16 and FIG. 17, by a tension load acting toward the vehicle rearward side on the rear portion 70C of the passenger seat side brace member 70, and the passenger seat side brace member 70 extends to the vehicle rearward side by a corresponding amount. Then, if the rear portion 70C of the passenger seat side brace member 70 is pulled further toward the vehicle rearward side, cracks are formed toward the inflected portion 72 from the incision 80 or 82 at both of side portions of the rear portion 70C, and the passenger seat side brace member 70 is broken at the inflected portion 72. After the passenger seat side brace member 70 breaks, no impact load is transmitted from the large diameter portion 14A of the instrument panel reinforcement 14 to the small diameter portion 14B. Therefore, the boundary portion between the large diameter portion 14A and the small diameter portion 14B does not deform.

Because this is structured by a single component, similarly to the passenger seat side brace member 26 illustrated in FIG. 13, cost reductions may be enabled.

If this is to be broken at an early time after the tension force acts on the rear portion 70C of the passenger seat side brace member 70, the incision 80 with the inverted "V" shape illustrated in FIG. 16 may be employed. In contrast, if this is to be broken at a late time after the tension force acts on the rear portion 70C of the passenger seat side brace member 70, the incision 82 with the long hole shape illustrated in FIG. 17 may be employed. In this case, because the shape of the incision 82 is not a pointed shape like the incision 80, a concentration of stress is moderated. Therefore, a timing at which cracks are formed is delayed a little, and the breakage timing may be delayed by a corresponding amount.

Supplementary Description of the Above Embodiments

In the first exemplary embodiment described above, the front end portion 28A of the front side bracket 28 of the passenger seat side brace member 26 is joined to the cowl inner panel 20, but this is not to be limiting. The front end portion 28A may be joined to the dashboard. This point similarly applies to the second to fourth exemplary embodiments.

In the first to fourth exemplary embodiments described above, the instrument panel reinforcement 14 whose cross-sectional shape is circular is used, but this is not to be limiting. Any instrument panel reinforcement is applicable as long as it is formed such that the driver seat side has a larger section modulus than the passenger seat side. Thus, for example, an instrument panel reinforcement with a rectangular cross section may be used.

In the first exemplary embodiment, the second exemplary embodiment and the two variant examples of the fourth exemplary embodiment, configurations are employed in which the rear side bracket 30 is detached from the front side bracket 28 of the passenger seat side brace member 26 or the like. In these cases, the rear side bracket 30 of the passenger seat side brace member 26 corresponds to "the side thereof of the direction of action of the tension load" of the present invention, and the cowl inner panel 20 and the front side bracket 28 that is left at the cowl inner panel 20 correspond to the "vehicle body" of the present invention. However, this is not to be limiting. Any configuration is possible as long as, of the passenger seat side brace member, at least the side of the direction of action of the tension load is detached from the vehicle body. Thus, taking the first exemplary embodiment as an example, the passenger seat side brace member may be formed as a non-dividing structure, and a detachment portion specified at a portion of joining between the front end portion of the passenger seat side brace member and the cowl inner panel 20. In this case, the whole of the passenger seat side brace member is detached from the cowl inner panel 20.

The invention claimed is:

1. An attachment structure of an instrument panel reinforcement for a vehicle, to be employed at an instrument panel reinforcement that is formed such that a driver seat side thereof has a greater section modulus than a passenger seat side thereof, the vehicle instrument panel reinforcement attachment structure comprising:
   a driver seat side brace member and a passenger seat side brace member that are disposed, respectively, at the driver seat side and passenger seat side of the instrument panel reinforcement, that are each formed in a long strip shape, and that join the instrument panel reinforcement with a cowl or dashboard disposed at the vehicle forward side of the instrument panel reinforcement; and
   a relative movement portion that is provided at the passenger seat side brace member and that, if a tension load of at least a predetermined value acts thereon, causes the passenger seat side brace member, at least at the side thereof of the direction of action of the tension load, to relatively move to the vehicle rearward side with respect to an attachment position of the passenger seat side brace member.

2. An attachment structure of an instrument panel reinforcement for a vehicle, to be employed at an instrument panel reinforcement that is formed such that a driver seat side thereof has a greater section modulus than a passenger seat side thereof, the vehicle instrument panel reinforcement attachment structure comprising:
   a driver seat side brace member and a passenger seat side brace member that are disposed, respectively, at the driver seat side and passenger seat side of the instrument panel reinforcement, that are each formed in a long strip shape, and that join the instrument panel reinforcement with a cowl or dashboard disposed at the vehicle forward side of the instrument panel reinforcement; and
   a detachment portion that is provided at the passenger seat side brace member and that, if a tension load of at least a predetermined value acts thereon, causes the passenger seat side brace member, at least at the side thereof of the direction of action of the tension load, to detach from a vehicle body.

3. The vehicle instrument panel reinforcement attachment structure according to claim 1, wherein
   the passenger seat side brace member is structured by a pair of a front side bracket and a rear side bracket that are fixed by fastening with a fastening portion, and
   the relative movement portion or is structured to include a fixed fastening state release mechanism that releases the fixed fastening state of the fastening portion when the tension load of at least the predetermined value acts.

4. The vehicle instrument panel reinforcement attachment structure according to claim 3, wherein the fixed fastening state release mechanism is structured as a detachment mechanism that causes the rear side bracket to detach from the front side bracket without breakage of a member.

5. The vehicle instrument panel reinforcement attachment structure according to claim 4, wherein the detachment mechanism includes a slit that is formed in the front side bracket or the rear side bracket and through which a bolt structuring the fastening portion passes, the detachment mechanism being configured such that, when the tension load of at least the predetermined value acts, the rear side bracket is detached from the front side bracket by the slit disengaging from the bolt or by the bolt disengaging from the slit.

6. The vehicle instrument panel reinforcement attachment structure according to claim 1, wherein
   the passenger seat side brace member is structured by a single bracket, and
   the relative movement portion or is a weakening portion that is provided at the bracket and breaks when the tension load of at least the predetermined value acts.

7. An attachment structure of an instrument panel reinforcement for a vehicle, to be employed at an instrument panel reinforcement that is formed such that a driver seat side thereof has a greater section modulus than a passenger seat side thereof, the vehicle instrument panel reinforcement attachment structure comprising:
   a driver seat side brace member and a passenger seat side brace member that are disposed, respectively, at the driver seat side and passenger seat side of the instrument panel reinforcement, that are each formed in a long strip shape, and that join the instrument panel reinforcement with a cowl or dashboard disposed at the vehicle forward side of the instrument panel reinforcement; and an extending structure portion that is provided at the passenger seat side brace member and that, if a tension load of at least a predetermined value acts thereon, causes the passenger seat side brace member to extend to the side of the direction of action of the tension load.

8. The vehicle instrument panel reinforcement attachment structure according to claim 1, wherein the passenger seat side brace member is structured by a pair of a front side bracket and a rear side bracket that are fixed by fastening with a fastening portion, and the relative movement portion or includes a long hole that is formed in the front side bracket or the rear side bracket and through which a bolt structuring the fastening portion passes, the relative movement portion or extending structure portion being configured such that, when the tension load of at least the predetermined value acts, the rear side bracket extends with respect to the front side bracket by the long hole sliding with respect to the bolt or by the bolt sliding in the long hole.

9. The vehicle instrument panel reinforcement attachment structure according to claim 7, wherein the passenger seat side brace member is structured by a single bracket and is inflected to the vehicle upward side or the vehicle downward side at a length direction middle portion thereof, and the inflected portion is configured so as to extend when the tension load of at least the predetermined value acts on the bracket.

10. The vehicle instrument panel reinforcement attachment structure according to claim 2, wherein the passenger seat side brace member is structured by a pair of a front side bracket and a rear side bracket that are fixed by fastening with a fastening portion, and the detachment portion is structured to include a fixed fastening state release mechanism that releases the fixed fastening state of the fastening portion when the tension load of at least the predetermined value acts.

11. The vehicle instrument panel reinforcement attachment structure according to claim 2, wherein the passenger seat side brace member is structured by a single bracket, and the detachment portion is a weakening portion that is provided at the bracket and breaks when the tension load of at least the predetermined value acts.

12. The vehicle instrument panel reinforcement attachment structure according to claim 7, wherein the passenger seat side brace member is structured by a pair of a front side bracket and a rear side bracket that are fixed by fastening with a fastening portion, and the extending structure portion includes a long hole that is formed in the front side bracket or the rear side bracket and through which a bolt structuring the fastening portion passes, the extending structure portion being configured such that, when the tension load of at least the predetermined value acts, the rear side bracket extends with respect to the front side bracket by the long hole sliding with respect to the bolt or by the bolt sliding in the long hole.

* * * * *